United States Patent
Moritaka et al.

(10) Patent No.: US 9,382,368 B2
(45) Date of Patent: Jul. 5, 2016

(54) REACTANT OF SILICON RESIN POLYCONDENSATE PARTICLES AND POLYVINYL CHLORIDE, METHOD FOR MANUFACTURING SAID REACTANT, VINYL CHLORIDE RESIN COMPOSITION, AND METHOD FOR MANUFACTURING VINYL CHLORIDE RESIN COMPOSITION

(75) Inventors: Kohei Moritaka, Shunan (JP); Yoshihiro Kubo, Shunan (JP); Yuhki Gotoh, Shunan (JP); Atsushi Kawano, Shunan (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/422,296

(22) PCT Filed: Aug. 17, 2012

(86) PCT No.: PCT/JP2012/070915
§ 371 (c)(1),
(2), (4) Date: Feb. 18, 2015

(87) PCT Pub. No.: WO2014/027421
PCT Pub. Date: Feb. 20, 2014

(65) Prior Publication Data
US 2015/0240019 A1    Aug. 27, 2015

(51) Int. Cl.
C08F 283/12    (2006.01)
C08G 77/442   (2006.01)
C08L 51/08     (2006.01)
C08L 27/06     (2006.01)

(52) U.S. Cl.
CPC ............ *C08F 283/12* (2013.01); *C08G 77/442* (2013.01); *C08L 27/06* (2013.01); *C08L 51/085* (2013.01)

(58) Field of Classification Search
None
See application file for complete search history.

(56) References Cited

U.S. PATENT DOCUMENTS

| | | | | |
|---|---|---|---|---|
| 4,680,343 A * | 7/1987 | Lee | ......................... | C08L 27/24 524/508 |
| 5,223,586 A | 6/1993 | Mautner et al. | | |
| 5,281,657 A * | 1/1994 | Mautner | ................ | C08G 77/06 106/287.14 |
| 5,457,167 A | 10/1995 | Higaki et al. | | |
| 5,605,983 A | 2/1997 | Dauth et al. | | |
| 5,629,388 A | 5/1997 | Himelrick et al. | | |
| 7,943,691 B2 * | 5/2011 | Shakir | .................. | C08K 5/0008 428/36.6 |

FOREIGN PATENT DOCUMENTS

| | | |
|---|---|---|
| EP | 0492376 | 12/1991 |
| EP | 0653447 | 11/1994 |
| EP | 0976789 | 2/2000 |
| EP | 1887019 | 2/2008 |
| JP | 60231720 A | 11/1985 |
| JP | 60255813 A | 12/1985 |
| JP | 61042519 A | 3/1986 |
| JP | 4277507 A | 10/1992 |
| JP | 7138331 A | 5/1995 |
| JP | 7207031 A | 8/1995 |
| JP | 8027346 A | 1/1996 |
| JP | 9136929 A | 5/1997 |
| JP | 9255705 A | 9/1997 |
| JP | 2000-264935 A * | 9/2000 |
| JP | 2000264935 A | 9/2000 |
| JP | 2012172081 A | 9/2012 |

OTHER PUBLICATIONS

Machine translation of JP 2000-264935 into English.*
Communication dated Feb. 26, 2015, issued by the International Bureau of WIPO in counterpart International application No. PCT/JP2012/070915.
Communication for European Application 12 89 1353.0 dated Feb. 2, 2016, along with Supplementary European Search Report dated Jan. 26, 2016.

* cited by examiner

*Primary Examiner* — Marc Zimmer
(74) *Attorney, Agent, or Firm* — Sughrue Mion, PLLC

(57) ABSTRACT

Provided is a reaction product of silicone resin polycondensate particles and polyvinyl chloride wherein the reaction product can impart excellent impact resistance and chemical resistance. The reaction product of silicone resin polycondensate particles and polyvinyl chloride according to the present invention is obtained by causing reaction of a material containing silicone resin polycondensate particles and vinyl chloride monomer. The silicone resin polycondensate particles are obtained by causing reaction of a material mixture containing a first organosilicon compound having a structural unit represented by a formula (1) and serving as a siloxane, a second organosilicon compound represented by a formula (2), and a third organosilicon compound represented by a formula (3A) or formula (3B).

16 Claims, No Drawings

REACTANT OF SILICON RESIN POLYCONDENSATE PARTICLES AND POLYVINYL CHLORIDE, METHOD FOR MANUFACTURING SAID REACTANT, VINYL CHLORIDE RESIN COMPOSITION, AND METHOD FOR MANUFACTURING VINYL CHLORIDE RESIN COMPOSITION

CROSS REFERENCE TO RELATED APPLICATIONS

This application is a National Stage of International Application No. PCT/JP2012/070915, filed on Aug. 17, 2012, the contents of all of which are incorporated herein by reference in their entirety.

TECHNICAL FIELD

The present invention relates to a vinyl chloride resin composition capable of providing formed articles having excellent impact resistance, thermal resistance, and chemical resistance, and a method for manufacturing the vinyl chloride resin composition. The present invention relates to a reaction product of silicone resin polycondensate particles and polyvinyl chloride to be blended in the vinyl chloride resin composition, and a method for manufacturing the reaction product.

BACKGROUND ART

Vinyl chloride-based resins usually have excellent mechanical strength, weather resistance, and chemical resistance. Because of these characteristics, vinyl chloride-based resins have been processed into various types of formed articles for application in many fields. Vinyl chloride-based resins, however, have a problem of relatively low impact resistance when used in applications requiring hardness. Vinyl chloride-based resins have been thus studied to increase the impact resistance.

As an exemplary vinyl chloride-based resin having increased impact resistance, Patent Document 1 below has disclosed a vinyl chloride-based resin in which an acrylic copolymer and vinyl chloride are graft-copolymerized.

Patent Document 2 below has disclosed a vinyl chloride-based resin obtained by subjecting vinyl chloride to suspension polymerization in the presence of a block copolymer having polyorganosiloxane units and (meth)acrylate polymer units.

Patent Document 3 below has disclosed a composition containing 100 parts by weight of a post-chlorinated polyvinyl chloride resin having a chlorine content ratio of 62 to 70 wt % and an average degree of polymerization of 600 to 1000, 15 to 25 parts by weight of a multi-component acrylic rubber resin, and 1 to 10 parts by weight of an acrylic processing aid.

RELATED ART DOCUMENT

Patent Document

Patent Document 1: JP-A No. S60-255813
Patent Document 2: JP-A No. H09-255705
Patent Document 3: JP-A No. H08-27346

SUMMARY OF THE INVENTION

Problems to be Solved by the Invention

The vinyl chloride-based resin described in Patent Document 1 requires polymerization of a larger amount of the acrylic copolymer in order to increase the impact resistance of formed articles of the vinyl chloride-based resin. This decreases the fatigue strength and thermal resistance of the formed articles.

The vinyl chloride-based resin described in Patent Document 2 can increase the impact resistance of formed articles of the vinyl chloride-based resin to some extent or can keep some fatigue strength of formed articles with a lower amount of the block copolymer because of the presence of the polyorganosiloxane units. This resin, however, failed to sufficiently increase the thermal resistance.

The composition described in Patent Document 3 can increase both the thermal resistance and the impact resistance of formed articles of the composition to some extent. The acrylic rubber itself, however, is susceptible to acid or alkaline chemical solutions, and thus the formed articles obtained have lower chemical resistance.

Therefore, using the vinyl chloride-based resin or the composition described in Patent Documents 1 to 3 causes a problem of difficulty in obtaining formed articles having all excellent impact resistance, thermal resistance, and chemical resistance.

An object of the present invention is to provide a reaction product of silicone resin polycondensate particles and polyvinyl chloride wherein the reaction product can impart excellent impact resistance and chemical resistance, and a method for manufacturing the reaction product. A limited object of the present invention is to provide a reaction product of silicone resin polycondensate particles and polyvinyl chloride wherein the reaction product can also impart thermal resistance, and a method for manufacturing the reaction product.

Another object of the present invention is to provide a vinyl chloride resin composition containing the reaction product of silicone resin polycondensate particles and polyvinyl chloride and a method for manufacturing a vinyl chloride resin composition, wherein the vinyl chloride resin composition can provide formed articles having excellent impact resistance and chemical resistance. A limited object of the present invention is to provide a vinyl chloride resin composition containing the reaction product of silicone resin polycondensate particles and polyvinyl chloride and a method for manufacturing a vinyl chloride resin composition, wherein the vinyl chloride resin composition can provide formed articles also having excellent thermal resistance.

Means for Solving the Problems

According to a broad aspect of the present invention, provided is a reaction product of silicone resin polycondensate particles and polyvinyl chloride obtained by causing reaction of a material containing silicone resin polycondensate particles and a vinyl chloride monomer (hereinafter may be abbreviated as reaction product X), the silicone resin polycondensate particles being obtained by causing reaction of a material mixture containing a first organosilicon compound having a structural unit represented by a formula (1) below and serving as a siloxane, a second organosilicon compound represented by a formula (2) below, and a third organosilicon compound represented by a formula (3A) or formula (3B) below.

[Chemical Formula 1]

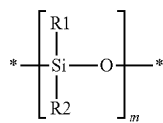

Formula (1)

In the formula (1), R1 and R2 each represent a phenyl group or a C1 to C3 alkyl group, and m represents an integer of from 1 to 20.

$$CH_2=CR3-(CH_2)_p-SiR4_q(OR5)_{3-q} \quad \text{Formula (2)}$$

In the formula (2), R3 represents a hydrogen atom or a methyl group, R4 and R5 each represent a hydrogen atom or a C1 to C3 alkyl group, p represents an integer of from 0 to 3, and q represents an integer of from 0 to 2.

$$R6-Si(OR7)_3 \quad \text{Formula (3A)}$$

In the formula (3A), R6 and R7 each represent a C1 to C3 alkyl group.

$$Si(OR8)_4 \quad \text{Formula (3B)}$$

In the formula (3B), R8 represents a C1 to C3 alkyl group.

In a specific aspect of the reaction product X according to the present invention, the silicone resin polycondensate particles are obtained by causing reaction of a mixture containing 100 parts by weight of the first organosilicon compound having the structural unit represented by the formula (1) above and serving as a siloxane, 3 parts by weight or more and 7 parts by weight or less of the second organosilicon compound represented by the formula (2) above, and 2 parts by weight or more and 10 parts by weight or less of the third organosilicon compound represented by the formula (3A) or formula (3B) above.

In a specific aspect of the reaction product X according to the present invention, the silicone resin polycondensate particles are obtained by causing reaction of a material mixture containing the first organosilicon compound having the structural unit represented by the formula (1) above and serving as a siloxane, the second organosilicon compound represented by the formula (2) above, the third organosilicon compound represented by the formula (3A) or formula (3B) above, and a fourth organosilicon compound represented by a formula (4A), formula (4B), or formula (4C) below.

[Chemical Formula 2]

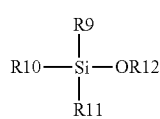

Formula (4A)

In the formula (4A), R9 to R11 each represent an unsaturated hydrocarbon group or a C1 to C3 alkyl group, and R12 represents a hydrogen atom or a C1 to C3 alkyl group.

[Chemical Formula 3]

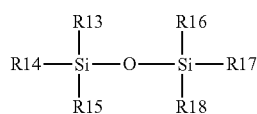

Formula (4B)

In the formula (4B), R13 to R18 each represent an unsaturated hydrocarbon group or a C1 to C3 alkyl group.

[Chemical Formula 4]

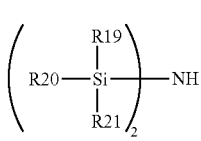

Formula (4C)

In the formula (4C), R19 to R21 each represent an unsaturated hydrocarbon group or a C1 to C3 alkyl group.

In a specific aspect of the reaction product X according to the present invention, the silicone resin polycondensate particles are obtained by causing reaction of a material mixture containing 100 parts by weight of the first organosilicon compound having the structural unit represented by the formula (1) above and serving as a siloxane, 0.5 parts by weight or more and 10 parts by weight or less of the second organosilicon compound represented by the formula (2) above, 0.5 parts by weight or more and 10 parts by weight or less of the third organosilicon compound represented by the formula (3A) or formula (3B) above, and 0.25 parts by weight or more and 10 parts by weight or less of the fourth organosilicon compound represented by the formula (4A), formula (4B), or formula (4C) above.

In a specific aspect of the reaction product X according to the present invention, the reaction product is obtained by causing reaction of a material containing 2 wt % or more and 95 wt % or less of the silicone resin polycondensate particles and 5 wt % or more and 98 wt % or less of the vinyl chloride monomer in 100 wt % of a total of the silicone resin polycondensate particles and the vinyl chloride monomer.

In a specific aspect of the reaction product X according to the present invention, the reaction product is obtained by causing reaction of a material containing 2 wt % or more and 20 wt % or less of the silicone resin polycondensate particles and 80 wt % or more and 98 wt % or less of the vinyl chloride monomer in 100 wt % of a total of the silicone resin polycondensate particles and the vinyl chloride monomer.

In a specific aspect of the reaction product X according to the present invention, the reaction product is obtained by causing reaction of a material containing 20 wt % or more and 95 wt % or less of the silicone resin polycondensate particles and 5 wt % or more and 80 wt % or less of the vinyl chloride monomer in 100 wt % of a total of the silicone resin polycondensate particles and the vinyl chloride monomer.

In a specific aspect of the reaction product X according to the present invention, the second organosilicon compound represented by the formula (2) above is vinyltriethoxysilane or vinyltrimetoxysilane.

In a specific aspect of the reaction product X according to the present invention, the reaction product is obtained by causing reaction of a material containing the silicone resin polycondensate particles and the vinyl chloride monomer, followed by washing with a solvent.

According to a broad aspect of the present invention, provided is a method for manufacturing a reaction product of silicone resin polycondensate particles and polyvinyl chloride, wherein the reaction product is provided by causing reaction of a material containing the silicone resin polycondensate particles and the vinyl chloride monomer, followed by washing with a solvent.

According to a broad aspect of the present invention, provided is a vinyl chloride resin composition containing the reaction product of silicone resin polycondensate particles and polyvinyl chloride, and a vinyl chloride resin or chlorinated vinyl chloride resin.

In a specific aspect of the vinyl chloride resin composition according to the present invention, a content ratio of the reaction product of silicone resin polycondensate particles and polyvinyl chloride to a total of the vinyl chloride resin and the chlorinated vinyl chloride resin is from 2.0:98.0 to 60.0:40.0 by weight.

In a specific aspect of the vinyl chloride resin composition according to the present invention, a content of particles derived from the silicone resin polycondensate particles is 1.6 wt % or more and 51 wt % or less.

In a specific aspect of the vinyl chloride resin composition according to the present invention, the vinyl chloride resin composition contains the chlorinated vinyl chloride resin and has a chlorine content ratio of 56.5 wt % or more and 65.5 wt % or less.

According to a broad aspect of the present invention, provided is a method for manufacturing a vinyl chloride resin composition, the method comprising the step of blending the vinyl chloride resin or chlorinated vinyl chloride resin with the reaction product obtained by causing reaction of a material containing the silicone resin polycondensate particles and the vinyl chloride monomer, to provide a vinyl chloride resin composition containing the reaction product and the vinyl chloride resin or chlorinated vinyl chloride resin.

In a specific aspect of the method for manufacturing a vinyl chloride resin composition according to the present invention, the reaction product and the chlorinated vinyl chloride resin are blended to provide a vinyl chloride resin composition containing the reaction product and the chlorinated vinyl chloride resin, and having a chlorine content ratio of 56.5 wt % or more and 65.5 wt % or less.

In a specific aspect of the method for manufacturing a vinyl chloride resin composition according to the present invention, the method for manufacturing a vinyl chloride resin composition further comprises the step of causing reaction of a material containing the silicone resin polycondensate particles and the vinyl chloride monomer to provide the reaction product.

Effect of the Invention

The reaction product of silicone resin polycondensate particles and polyvinyl chloride according to the present invention is a reaction product obtained by causing reaction of a material containing silicone resin polycondensate particles and a vinyl chloride monomer, the silicone resin polycondensate particles being obtained by causing reaction of a material mixture containing a first organosilicon compound having a structural unit represented by a formula (1) and serving as a siloxane, a second organosilicon compound represented by a formula (2), and a third organosilicon compound represented by a formula (3A) or formula (3B). Thus, using the reaction product of silicone resin polycondensate particles and polyvinyl chloride according to the present invention can impart excellent impact resistance and chemical resistance.

MODE(S) FOR CARRYING OUT THE INVENTION

The present invention will be described below in detail.
(Reaction Product of Silicone Resin Polycondensate Particles and Polyvinyl Chloride)

The reaction product of silicone resin polycondensate particles and polyvinyl chloride according to the present invention is a reaction product (hereinafter may be abbreviated as reaction product X) obtained by causing reaction of a material containing silicone resin polycondensate particles (hereinafter may be abbreviated as particles A) and a vinyl chloride monomer. The reaction product X above contains particles (hereafter may be referred to as particles B, e.g., particles bound to polyvinyl chloride) derived from the particles A. For example, the particles B are dispersed in reaction product X.

The silicone resin polycondensate particles A are obtained by causing reaction of a material mixture containing a first organosilicon compound having a structural unit represented by a formula (1) below and serving as a siloxane, a second organosilicon compound represented by a formula (2) below, a third organosilicon compound represented by a formula (3A) or formula (3B) below, and a fourth organosilicon compound represented by a formula (4A), formula (4B), or formula (4C) below.

[Chemical Formula 5]

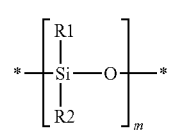

Formula (1)

In the formula (1), R1 and R2 each represent a phenyl group or a C1 to C3 alkyl group, and m represents an integer of from 1 to 20. m may be an integer of 2 or more. When m is 2 or more, a plurality of R1s and a plurality of R2s may be the same or different.

$$CH_2=CR3\text{-}(CH_2)_p\text{—}SiR4_q(OR5)_{3-q}$$ Formula (2)

In the formula (2), R3 represents a hydrogen atom or a methyl group, R4 and R5 each represent a hydrogen atom or a C1 to C3 alkyl group, p represents an integer of from 0 to 3, and q represents an integer of from 0 to 2. When q is 2, a plurality of R4s may be the same or different. When q is 0 or 1, a plurality of R5s may be the same or different.

$$R6\text{-}Si(OR7)_3$$ Formula (3A)

In the formula (3A), R6 and R7 each represent a C1 to C3 alkyl group. A plurality of R7s may be the same or different.

$$Si(OR8)_4$$ Formula (3B)

In the formula (3B), R8 represents a C1 to C3 alkyl group. A plurality of R8s may be the same or different.

Since the reaction product X according to the present invention has the above constitution, the use of the reaction product X can impart excellent impact resistance and chemical resistance. That is, the use of a vinyl chloride resin composition containing the reaction product X can provide formed articles having excellent impact resistance and chemical resistance. The present invention can improve both the impact resistance and the chemical resistance.

Further, since the reaction product X according to the present invention has the above constitution, the use of the reaction product X can also impart excellent thermal resistance (thermal stability). That is, the use of a vinyl chloride resin composition containing the reaction product X can provide formed articles further having excellent thermal resistance. The present invention can improve all the impact resistance, thermal resistance, and chemical resistance.

In the present invention, silicone resin polycondensate particles, which usually have a difficulty of being dispersed in polyvinyl chloride, can be dispersed well in polyvinyl chloride in the form of the reaction product X. Conventional silicone resin polycondensate particles tend to easily cause fusion between the silicone resin polycondensate particles, which makes it difficult to increase the content of the silicone resin polycondensate particles (e.g., 20 wt % or more) in polyvinyl chloride in order to furthermore improve the impact resistance. Meanwhile, the use of the specific particles A above can prevent fusion between the particles A, which enables dispersion of the particles A with a high density in polyvinyl chloride.

The silicone resin polycondensate particles A are preferably obtained by causing reaction of a material mixture containing the first organosilicon compound having the structural unit represented by the formula (1) above and serving as a siloxane, the second organosilicon compound represented by the formula (2) above, the third organosilicon compound represented by the formula (3A) or formula (3B) above, and a fourth organosilicon compound represented by a formula (4A), formula (4B), or formula (4C) below.

[Chemical Formula 6]

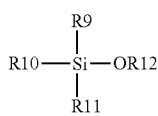

Formula (4A)

In the formula (4A), R9 to R11 each represent an unsaturated hydrocarbon group or a C1 to C3 alkyl group, and R12 represents a hydrogen atom or a C1 to C3 alkyl group.

[Chemical Formula 7]

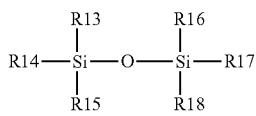

Formula (4B)

In the formula (4B), R13 to R18 each represent an unsaturated hydrocarbon group or a C1 to C3 alkyl group.

[Chemical Formula 8]

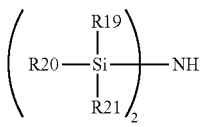

Formula (4C)

In the formula (4C), R19 to R21 each represent an unsaturated hydrocarbon group or a C1 to C3 alkyl group. A plurality of R19s, a plurality of R20s, and a plurality of R21s may be the same or different.

In particular, the use of the fourth organosilicon compound represented by the formula (4A), formula (4B), or formula (4C) above in the production of the particles A can effectively prevent fusion between the particles A, which enables good dispersion of the particles A in polyvinyl chloride.

Therefore, the use of the fourth organosilicon compound can more effectively improve the impact resistance, thermal resistance, and chemical resistance of formed articles of the vinyl chloride resin composition containing the reaction product X according to the present invention. That is, the use of the vinyl chloride resin composition containing the reaction product X can provide formed articles having more improved impact resistance, thermal resistance, and chemical resistance. The use of the fourth organosilicon compound can further improve all the impact resistance, thermal resistance, and chemical resistance.

Specific examples of the first organosilicon compound having the structural unit represented by the formula (1) above and serving as a siloxane include linear siloxanes and cyclic siloxanes. The first organosilicon compound is preferably a polysiloxane. In the formula (1), m is preferably an integer of from 2 to 20.

From the viewpoint of improving the operability in the process for manufacturing the silicone resin polycondensate particles, the first organosilicon compound is preferably a cyclic siloxane, preferably a cyclic polysiloxane. Examples of the cyclic siloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. For the purpose of being copolymerized with a vinyl chloride monomer, a first organosilicon compound having a radical-polymerizable unsaturated double bond may be used. The first organosilicon compounds may be used singly or may be used in any combination thereof.

The use of the second organosilicon compound represented by the formula (2) above can combine polyvinyl chloride and silicone, which naturally have no or low affinity to each other. The second organosilicon compound involves in dispersing particles B derived from the particles A in the reaction product X and preventing an acid or alkaline chemical solution from entering the gaps between the particles B and the resin in the formed articles.

Specific examples of the second organosilicon compound represented by the formula (2) above include vinyltrimetoxysilane, vinyltriethoxysilane, vinylmethyldimethoxysilane, vinylethyldiethoxysilane, allyltrimethoxysilane, allyltriethoxysilane, and allyltripropoxysilane. Among the second organosilicon compounds, the organosilicon compound represented by the formula (2) above is more preferably vinyltrimetoxysilane or vinyltriethoxysilane from the viewpoint of improving the reaction efficiency and further improving the graft rate. The second organosilicon compounds may be used singly or may be used in any combination thereof.

The amount of the second organosilicon compound used in the production of the particles A is not particularly limited. In the production of the particles A, the amount of the second organosilicon compound used is preferably 0.5 parts by weight or more, more preferably 2 parts by weight or more, still more preferably 3 parts by weight or more, and preferably 10 parts by weight or less, more preferably 7 parts by weight or less, still more preferably 5 parts by weight or less, with respect to 100 parts by weight of the first organosilicon compound. When the amount of the second organosilicon compound used is equal to or more than the above lower limit, the particles A are easily bound to the vinyl chloride monomer sufficiently. This sufficient binding hardly generates interfacial separation between the particles B derived from the particles A and the resin in the vinyl chloride resin composition. Accordingly, the particles B are easily dispersed in the polyvinyl chloride, and the impact resistance of the vinyl chloride resin composition and the formed articles can be improved. When the amount of the second organosilicon compound used is equal to or less than the above upper limit, the interactions between polyvinyl chlorides bound to the particles B decrease during heat-forming of the vinyl chloride resin composition, the uneven surface of the formed articles is hardly generated, and therefore favorable appearance of the formed articles is provided.

The third organosilicon compound represented by the formula (3A) or formula (3B) above involves in controlling the hardness of the particles A and particles B above to impart the impact resistance to the formed articles, and accordingly functions as a cross-linking agent. As the third organosilicon compound, the third organosilicon compound represented by the formula (3A) above may be used, or the third organosilicon compound represented by the formula (3B) above may be used.

Specific examples of the third organosilicon compound represented by the formula (3A) or formula (3B) above include tetramethoxysilane, tetraethoxysilane, tetraisopropoxysilane, methyltrimethoxysilane, methyltriethoxysilane, and methyltriisopropoxysilane. The third organosilicon compounds may be used singly or may be used in any combination thereof.

The amount of the third organosilicon compound used in the production of the particles A is not particularly limited. In the production of the particles A, the amount of the third organosilicon compound used is preferably 0.5 parts by weight or more, more preferably 2 parts by weight or more, still more preferably 3 parts by weight or more, and preferably 10 parts by weight or less, more preferably 7 parts by weight or less, with respect to 100 parts by weight of the first organosilicon compound. When the amount of the third organosilicon compound used is equal to or more than the above lower limit, the particles B are hardly deformed, the particles B are hardly separated from polyvinyl chloride during heat-forming of the vinyl chloride resin composition, the uneven surface of the formed articles is hardly generated, and therefore favorable appearance of the formed articles is provided. When the amount of the third organosilicon compound used is equal to or less than the above upper limit, the viscosity is hardly increased excessively to facilitate the polymerization in the polymerization reaction to produce the particles A, and also the rubber component is hardly hardened, and therefore the impact resistance of the formed articles can be improved.

The use of the fourth organosilicon compound represented by the formula (4A), formula (4B), or formula (4C) above can make it difficult to cause fusion between the silicone resin polycondensate particles, which naturally tends to easily occur. As the fourth organosilicon compound, the fourth organosilicon compound represented by the formula (4A) above may be used, the fourth organosilicon compound represented by the formula (4B) above may be used, or the fourth organosilicon compound represented by the formula (4C) above may be used.

The fourth organosilicon compound represented by the formula (4A), formula (4B), or formula (4C) above binds to silanol groups on the surface of the particles A and thus functions as a surface treatment agent for hindering formation of the siloxane bonds between the particles.

In the formula (4A), formula (4B), or formula (4C) above, the unsaturated hydrocarbon group is preferably a vinyl group, allyl group, or phenyl group. The unsaturated hydrocarbon group may be a vinyl group or allyl group, or may be a phenyl group. The unsaturated hydrocarbon group may be a vinyl group or may be an allyl group.

Specific examples of the fourth organosilicon compound represented by the formula (4A), formula (4B), or formula (4C) above include monoalkoxysilane compounds such as trimethylmethoxysilane, trimethylethoxysilane, triethylmethoxysilane, and dimethylvinylmethoxysilane; disiloxane compounds such as hexamethyldisiloxane; and disilazane compounds such as hexamethyldisilazane. The fourth organosilicon compounds may be used singly or may be used in any combination thereof.

The amount of the fourth organosilicon compound used in the production of the particles A is not particularly limited. In the production of the particles A, the amount of the fourth organosilicon compound used is preferably 0.25 parts by weight or more, more preferably 1.5 parts by weight or more, and preferably 10 parts by weight or less, more preferably 5 parts by weight or less, with respect to 100 parts by weight of the first organosilicon compound. When the amount of the fourth organosilicon compound used is equal to or more than the above lower limit, the particles B are easily dispersed in the resin to express the impact resistance during heat-forming of the vinyl chloride resin composition. When the amount of the fourth organosilicon compound used is equal to or less than the above upper limit, the lubricity of the particles B is prevented from excessively increasing during heat-forming of the vinyl chloride resin composition, and therefore forming is easy performed.

The method for producing the silicone resin polycondensate particles (particles A) is not particularly limited, and examples thereof include a suspension polymerization method, an emulsion polymerization method, a micro-suspension polymerization method, a solution polymerization method, and a bulk polymerization method. An emulsion polymerization method or micro-suspension polymerization method is preferred because these methods easily control the particle size of the particles A and further the formed articles express the impact resistance well. It is noted that the polymerization to produce the particles A includes any copolymerization such as random copolymerization, block copolymerization, and graft copolymerization.

As the emulsion polymerization method or micro-suspension polymerization method, conventionally-known methods can be employed. In the emulsion polymerization or micro-suspension polymerization, for example, an emulsifying dispersant, polymerization initiator, pH adjuster, or antioxidant may be optionally used.

The emulsifying dispersant is used to improve the dispersion stability of monomer components in an emulsified liquid to enhance the polymerization efficiency. The emulsifying dispersant is not particularly limited, and examples thereof include anionic surfactants, nonionic surfactants, partially saponified polyvinyl alcohols, cellulose-based dispersants, and gelatin. The emulsifying dispersant is preferably alkylbenzene sulfonic acid. Alkylbenzene sulfonic acid can be used also as a polymerization initiator. The emulsifying dispersants may be used singly or may be used in any combination thereof.

The polymerization initiator is not particularly limited, and examples thereof include acids such as sulfuric acid, hydrochloric acid, and alkylbenzene sulfonic acid; and alkalis such as sodium hydroxide and potassium hydroxide. Of these, alkylbenzene sulfonic acid, which can be also used as an emulsifier, is preferred. The polymerization initiators may be used singly or may be used in any combination thereof.

The kind of the emulsion polymerization method is not particularly limited, and examples thereof include a batch polymerization method, a monomer dropping method, and an emulsion dropping method.

The batch polymerization method involves adding pure water, an emulsifying dispersant, and a monomer mixture collectively to a jacketed polymerization reactor; stirring the resulting mixture under nitrogen gas pressure to obtain sufficient emulsification; and then increasing the internal temperature of the reactor to a predetermined temperature with a jacket while stirring the mixture, followed by polymerization.

The monomer dropping method involves adding pure water, an emulsifying dispersant, and a polymerization initiator to a jacketed polymerization reactor; performing deoxidation and pressurization under nitrogen gas flow; increasing the internal temperature of the reactor to a predetermined temperature while stirring the mixture; and then adding aliquots of a monomer mixture dropwise to cause polymerization.

The emulsion dropping method involves stirring a monomer mixture, an emulsifying dispersant, and pure water to prepare an emulsified monomer in advance; then adding pure water and a polymerization initiator to a jacketed polymerization reactor; performing deoxidation and pressurization under nitrogen gas flow while stirring the mixture; increasing the internal temperature of the reactor to a predetermined temperature; and then adding aliquots of the emulsified monomer dropwise to cause polymerization.

When the emulsion dropping method includes adding a part of the emulsified monomer at one time in the early polymerization stage and then adding the rest of the emulsified monomer dropwise, the particle size of the particles A can be easily controlled by changing the amount of the emulsified monomer to be added at one time.

For a polymerization apparatus, polymerization apparatuses commonly used for polymerization may be used. The shape, material and other features of the polymerization apparatus are not particularly limited.

The reaction to produce the particles A is preferably performed in the presence of an acid or alkaline catalyst.

In the polymerization method, the reaction temperature is not particularly limited and may be changed in multiple steps during the polymerization.

The reaction temperature is preferably from 30° C. to 100° C. in order to efficiently facilitate the ring-opening polymerization reaction of the cyclic siloxane, the cleavage of the first organosilicon compound, the hydrolysis of the second and third organosilicon compounds, and the dehydration/condensation reactions of the first, second, third, and fourth organosilicon compounds. The reaction temperature is more preferably from 70° C. to 95° C. in order to increase the reaction rate while the reaction rate is controlled to some extent. The reaction time is also not particularly limited, but preferably from 2 to 6 hours in order that the ring-opening reaction proceeds sufficiently.

The reaction temperature is preferably from 0° C. to 60° C. in order to sufficiently increase the molecular weight after the reaction of the first organosilicon compound and further to suppress breakage of the binding parts to the second, third, and fourth organosilicon compounds. The reaction temperature is preferably maintained from 30° C. to 50° C. in order to increase the reaction rate to some extent, to sufficiently increase the molecular weight after the reaction of the first organosilicon compound, and further to efficiently react with the second, third, and fourth organosilicon compounds. The reaction time is also not particularly limited, but preferably from 3 to 12 hours in order to sufficiently increase the molecular weight after the reaction of the first organosilicon compound.

In order to efficiently facilitate the cleavage of the first organosilicon compound, the hydrolysis of the second, third, and fourth organosilicon compounds, and the dehydration/condensation reactions of the first, second, third, and fourth organosilicon compounds, as well as to sufficiently increase the molecular weight after the reaction of the first organosilicon compound and further to suppress cleavage of the main chain of the produced polymer and suppress cleavage of the binding parts of the main chain to the second, third, and fourth organosilicon compounds, it is preferred that the reaction be initiated at from 50° C. to 100° C. and kept for a necessary and sufficient time to cleave the first organosilicon compound, and then the temperature be decreased to 0° C. to 60° C. and kept for a necessary and sufficient time. This can sufficiently increase the molecular weight after the reaction of the first organosilicon compound to improve the efficiency of the reactions between the main chain of the produced polymer and the second, third, and fourth organosilicon compounds. Since the reaction time can be reduced to some extent, the reaction is preferably carried out at 70° C. to 95° C. for 2 to 5 hours and further at 30° C. to 50° C. for 3 to 8 hours.

The average particle size of the particles A and the particles B is not particularly limited. The average particle size of the particles A and the particles B is preferably 0.1 µm or more, more preferably 0.14 µm or more, and more preferably 0.5 µm or less. When the average particle size is equal to or more than the above lower limit, the impact resistance of the formed articles have higher impact resistance. When the average particle size is equal to or less than the above upper limit, the formed articles have higher tensile strength.

In the polymerization method, the solid content ratio in the particles A obtained after completion of the reaction is not particularly limited. From the viewpoint of increasing the productivity of the particles A and the stability of the polymerization reaction, the solid content ratio of the particles A obtained after completion of the reaction is preferably 10 wt % or more, preferably 50 wt % or less. In the polymerization method, a protective colloid or the like may be used for the purpose of improving the mechanical stability of the particles A.

The reaction between the particles A and polyvinyl chloride is preferably carried out in the presence of a radical polymerization catalyst. For example, the particles B are dispersed in the reaction product X. These particles B are, for example, bound to polyvinyl chloride. In the polymerization reaction in a material containing the particles A and the vinyl chloride monomer, a vinyl monomer copolymerizable with the vinyl chloride monomer may be used. The material may contain a vinyl monomer copolymerizable with the vinyl chloride monomer.

The vinyl monomer copolymerizable with the vinyl chloride monomer is not particularly limited, and examples thereof include vinyl acetate, alkyl(meth)acrylates, alkyl vinyl ethers, ethylene, vinyl fluoride, and maleimide. One kind of vinyl monomer may be used or two or more kinds of vinyl monomers may be used in any combination.

In the production of the reaction product X, the blending ratio of the silicone resin polycondensate particles (particles A) to the vinyl chloride monomer is not particularly limited. In the material for producing the reaction product X, the content of the particles A is preferably 2 wt % or more and 95 wt % or less and the content of the vinyl chloride monomer is preferably 5 wt % or more and 98 wt % or less in 100 wt % of the total of the particles A and the vinyl chloride monomer. When the first, second, third organosilicon compounds are used, the content of the particles A is preferably 2 wt % or more and 20 wt % or less and the content of the vinyl chloride monomer is preferably 80 wt % or more and 98 wt % or less in 100 wt % of the total of the particles A and the vinyl chloride monomer in the material for producing the reaction product X. When the first, second, third, and fourth organosilicon compounds are used, the content of the particles A is preferably 20 wt % or more and 95 wt % or less and the content of the vinyl chloride monomer is preferably 5 wt % or more and 80 wt % or less in 100 wt % of the total of the particles A and the vinyl chloride monomer in the material for producing the reaction product X. The use of the reaction product X obtained by causing the particles A and the vinyl chloride monomer to react in such preferred contents can provide formed articles of the vinyl chloride resin composition having more improved impact resistance, thermal resistance, and chemical resistance. When the content of the particles A is equal to or more than the above lower limit, the chlorine content ratio in the vinyl chloride resin composition can easily properly increase to further improve the thermal resistance of the formed articles. When the content of the particles A is equal to or less than the above upper limit, the particles B can be easily dispersed in reaction product X to further improve the impact resistance of the formed articles.

In the material for producing the reaction product X, the content of the particles A may be 15 wt % more and 75 wt % or less and the content of the vinyl chloride monomer may be 25 wt % or more and 85 wt % or less; the content of the particles A may be 15 wt % more and 30 wt % or less and the content of the vinyl chloride monomer may be 70 wt % or more and 85 wt % or less, in 100 wt % of the total of the particles A and the vinyl chloride monomer.

When the content of the particles A is equal to or more than the above lower limit and the content of the vinyl chloride monomer is equal to or less than the above upper limit in the material, the application of the vinyl chloride resin composition according to present invention to formed articles, such as rigid polyvinyl chloride pipes or profile extrudates, further improves the impact resistance of the formed articles. When the content of the particles A is equal to or less than the above upper limit and the content of the vinyl chloride monomer is equal to or more than the above lower limit in the material, the formed articles have higher mechanical strength.

Furthermore, when the first, second, third organosilicon compounds are used, the content of the particles A is preferably 3 wt % or more and 16 wt % or less and the content of the vinyl chloride monomer is preferably 84 wt % or more and 97 wt % or less in 100 wt % of the total of the particles A and the vinyl chloride monomer in the material for producing the reaction product X. When the first, second, third, and fourth organosilicon compounds are used, the content of the particles A is more preferably 50 wt % or more and 85 wt % or less and the content of the vinyl chloride monomer is more preferably 15 wt % or more and 50 wt % or less in 100 wt % of the total of the particles A and the vinyl chloride monomer in the material for producing the reaction product X. The use of the reaction product X obtained by causing the particles A and the vinyl chloride monomer to react in such preferred contents can provide formed articles of the vinyl chloride resin composition having more improved impact resistance, thermal resistance, and chemical resistance. When the content of the particles A is equal to or more than the above lower limit, the chlorine content ratio in the vinyl chloride resin composition according to the present invention can further increase easily to further improve the thermal resistance of the formed articles. When the content of the particles A is equal to or less than the above upper limit, the particles B can be more easily dispersed in the reaction product X to further improve the impact resistance of the formed articles.

The above polymerization reaction, for example, causes graft copolymerization of the vinyl chloride monomer with the particles A. A graft rate is defined as the weight fraction (wt %) of vinyl chloride molecules graft-copolymerized and chemically bound with/to the particles B per weight percent of unit silicone resin polycondensate particles (particles B).

The graft rate in the reaction product X is preferably 0.4 wt % or more. When the graft rate in the reaction product X is 0.4 wt % or more, polyvinyl chloride is hardly separated from the surface of the particles B, uniform dispersion of the particles B in polyvinyl chloride is easily caused, and therefore the impact resistance of the reaction product X and the formed articles can be further improved. Furthermore, when the graft rate in the reaction product X is 0.4 wt % or more, an acid or alkaline chemical solution can be suppressed from entering into the interface of the reaction product X under the condition where the reaction product X is in contact with the chemical solution, and the performance degradation due to the chemical solution can be suppressed.

The reaction product X containing polyvinyl chloride and the particles B can suppress the deterioration due to hydrogen chloride generated by photodegradation of polyvinyl chloride. This increases the weather resistance of the reaction product X.

The graft copolymerization method is not particularly limited, and examples thereof include a suspension polymerization method, an emulsion polymerization method, a solution polymerization method, and a bulk polymerization method. Of these, a suspension polymerization method is preferred.

In the polymerization by the suspension polymerization method, a dispersant, an oil-soluble polymerization initiator, or the like may be used. The use of the dispersant can improve the dispersion stability of the particles A in the material and thus can cause the graft copolymerization of vinyl chloride to proceed efficiently.

The dispersant is not particularly limited, and examples thereof include poly(meth)acrylate, (meth)acrylate/alkyl, acrylate copolymers, methyl cellulose, ethyl cellulose, hydroxypropyl methylcellulose, polyethylene glycol, polyvinyl acetate and its partially saponified product, gelatin, polyvinylpyrrolidone, starch, and maleic anhydride/styrene copolymer. The dispersants may be used singly or may be used in any combination thereof.

The oil-soluble polymerization initiator is not particularly limited. The oil-soluble polymerization initiator is preferably a radical polymerization initiator. Examples of the oil-soluble polymerization initiator include organic peroxides such as lauroyl peroxide, t-butyl peroxypivalate, diisopropyl peroxycarbonate, dioctyl peroxydicarbonate, t-butyl peroxyneodecanoate, α-cumyl peroxyneodecanoate; and azo compounds such as 2,2-azobisisobutyronitrile and 2,2-azobis-2,4-dimethylvaleronitrile. The oil-soluble polymerization initiators may be used singly or may be used in any combination thereof.

In the graft copolymerization of vinyl chloride, a scale inhibitor, pH adjuster, antioxidant, or the like may be used for the purpose of reducing the amount of adhering substances that adhere to the inside of a polymerization tank during polymerization. A scale inhibitor is particularly preferably used. Furthermore, the polymerization apparatus may be modified by changing the shape, material, other features of the inside of the polymerization tank, and/or those of an impeller, baffle, and the like as appropriate; or the polymerization conditions such as stirring rate may be changed. In the reaction of the material containing the particles A and the vinyl chloride monomer, a scale inhibitor is preferably used.

The scale inhibitor is not particularly limited. Examples of the scale inhibitor include polyhydric phenols that are obtained by the condensation reaction of one or more compounds selected from polyaminobenzenes, polyhydric phenols, aminophenols, alkyl-substituted phenols. The scale inhibitor may be diluted with water or organic solvents. The scale inhibitors may be used singly or may be used in any combination thereof.

The suspension polymerization method can be carried out, for example, in the following manner. A polymerization vessel equipped with a temperature controller and a stirrer is charged with a dispersed solution containing pure water, the dispersant, the oil-soluble polymerization initiator, the particles A, and optionally a water-soluble thickener and a polymerization degree-regulating agent, and then evacuated with a vacuum pump. Next, vinyl chloride and optionally other vinyl monomers are introduced to the polymerization vessel under stirring condition. Subsequently, the internal temperature of the reaction vessel is increased to promote the polymerization reaction in the material at a desired polymerization temperature for the graft copolymerization. In the polymerization reaction, the polymerization temperature is preferably from 30° C. to 90° C. The polymerization time is preferably from 2 to 20 hours.

In the suspension polymerization method, the internal temperature of the reaction vessel, i.e., the polymerization temperature can be controlled by changing the jacket temperature. After completion of the reaction, for example, the reaction product X can be obtained by removing a vinyl monomer mainly including unreacted vinyl chloride, followed by dehydration and drying.

The blending ratio of the particles A and the vinyl chloride monomer used for the polymerization reaction may not correspond to the content of the particles B derived from the particles A and the content of the polyvinyl chloride polymerized with the vinyl chloride monomer. This is because some of the particles A and some of the vinyl chloride monomers remain unreacted and they are removed after the polymerization.

The degree of polymerization of polyvinyl chloride obtained by the polymerization reaction is preferably 400 or more, more preferably 500 or more, and preferably 3,000 or less, more preferably 1,400 or less. When the degree of polymerization is the above lower limit or more and the above upper limit or less, the formability of the vinyl chloride resin composition during forming of the vinyl chloride resin composition can be further increased. In addition, formed articles having more improved impact resistance and thermal resistance can be obtained.

The reaction product X is preferably obtained by causing reaction of a material containing the silicone resin polycondensate particles A and the vinyl chloride monomer, followed by washing with a solvent. In the method for manufacturing the reaction product X of the silicone resin polycondensate particles A and the polyvinyl chloride according to the present invention, the reaction product X is preferably obtained by causing reaction of a material containing the silicone resin polycondensate particles A and the vinyl chloride monomer, followed by washing with a solvent. The washing with a solvent can further impart more improved impact resistance. That is, the use of the vinyl chloride resin composition containing the reaction product X washed with a solvent can provide formed articles having more improved impact resistance. The reason that the washing with a solvent improves the impact resistance is expected to be that the silicone component, which hinders sufficient expression of the impact resistance, is removed from the reaction product X.

Specific examples of the solvent include aliphatic solvents, ketone-based solvents, aromatic solvents, ester-based solvents, ether-based solvents, alcohol-based solvents, paraffin-based solvents, and petroleum-based solvents. The solvents may be used singly or may be used in any combination thereof.

The aliphatic solvents include cyclohexane, methylcyclohexane, ethylcyclohexane, and the like. The ketone-based solvents include acetone, methyl ethyl ketone, and the like. The aromatic solvents include toluene, xylene, and the like. The ester-based solvents include ethyl acetate, butyl acetate, isopropyl acetate, and the like. The ether-based solvents include tetrahydrofuran (THF), dioxane, and the like. The alcohol-based solvents include ethanol, butanol, and the like. The paraffin-based solvents include paraffin oils, naphthenic oils, and the like. The petroleum-based solvents include mineral turpentine, naphtha, and the like.

In the case of washing with the solvent, for example, a substance produced after the reaction (reaction product before washing) is placed in the solvent. A substance produced by reaction usually swells. Next, the substance produced by reaction placed in the solvent is recovered by filtering to obtain the reaction product X. The solvent may be poured on the substance produced by reaction to wash the substance produced by reaction.

From the viewpoint of effectively increasing the impact resistance, the solvent is preferably an organic solvent, preferably an ether-based solvent, preferably a solvent having an ether bond, preferably a solvent that can dissolve the first, second, and third organosilicon compounds at 23° C., preferably a solvent that can dissolve the first, second, third, and fourth organosilicon compounds at 23° C., particularly preferably tetrahydrofuran.

(Vinyl Chloride Resin Composition and Method for Manufacturing Vinyl Chloride Resin Composition)

The vinyl chloride resin composition according to the present invention contains the reaction product X of the silicone resin polycondensate particles A and polyvinyl chloride described above, and a vinyl chloride resin or chlorinated vinyl chloride resin. The vinyl chloride resin composition according to the present invention may contain only a vinyl chloride resin, or may contain only a chlorinated vinyl chloride resin, and may include both of a vinyl chloride resin and a chlorinated vinyl chloride resin.

The vinyl chloride resin is not chlorinated. The vinyl chloride resin excludes a chlorinated vinyl chloride resin. The degree of polymerization of the vinyl chloride resin is not particularly limited, but preferably about from 500 to 1000 in order to achieve sufficient gelation from the viewpoint of the expression of the impact resistant during melt kneading. The vinyl chloride resins may be used singly or may be used in any combination thereof.

The chlorinated vinyl chloride resin is preferably a post-chlorinated vinyl chloride resin. The post-chlorinated vinyl chloride resin refers to a resin obtained by obtaining a vinyl chloride resin and then chlorinating the vinyl chloride resin. The method for manufacturing the chlorinated vinyl chloride resin is not particularly limited. The degree of polymerization of the chlorinated vinyl chloride resin is not particularly limited, but preferably about from 500 to 1000 in order to achieve gelation sufficient to express the impact resistant during melt kneading. The chlorinated vinyl chloride resins may be used singly or may be used in any combination thereof. When the vinyl chloride resin composition includes the chlorinated vinyl chloride resin, the vinyl chloride resin may not or may include the vinyl chloride resin. In order to control the chlorine content ratio and the processability, two or more of the chlorinated vinyl chloride resins can be used.

The chlorine content ratio in the vinyl chloride resin composition according to the present invention is preferably 56.5 wt % or more and preferably 65.5 wt % or less. The chlorine content ratio is the weight fraction of chlorine atoms in the total weight of the vinyl chloride resin composition. When the chlorine content ratio is 56.5 wt % or more, the formed articles have higher strength and better thermal resistance. When the chlorine content ratio is 65.5 wt % or less, the formed articles have better impact resistance. From the viewpoint of achieving both the thermal resistance and the impact resistance at higher level, the chlorine content ratio in the vinyl chloride resin composition is more preferably 58.5 wt % or more and more preferably 63.0 wt % or less.

The method for controlling the chlorine content ratio from the above lower limit or more to the above upper limit or less in the vinyl chloride resin composition is not particularly limited. In order to control the chlorine content ratio from the above lower limit or more to the above upper limit or less in the vinyl chloride resin composition, the vinyl chloride resin composition preferably contains a chlorinated vinyl chloride resin having a chlorine content ratio of 64.0 wt % or more and 70.5 wt % or less. When the chlorine content ratio is equal to or more than the above lower limit in the chlorinated vinyl chloride resin composition, the formed articles have higher thermal resistance. When the chlorine content ratio is equal to or less than the above upper limit in the chlorinated vinyl chloride resin, the chlorinated vinyl chloride resin can easily melt to further improve the impact resistance of the formed articles. From the viewpoint of achieving both the thermal resistance and the impact resistance at higher level, the chlorine content ratio in the chlorinated vinyl chloride resin is preferably 65 wt % or more and preferably 68.5 wt % or less.

In the vinyl chloride resin composition according to the present invention, the content ratio of the reaction product X to the total content of the vinyl chloride resin and the chlorinated vinyl chloride resin is preferably from 2.0:98.0 to 60.0: 40.0, more preferably from 3.0:97.0 to 42.0:58.0 by weight. When the content ratio of the reaction product X to the total content of the vinyl chloride resin and the chlorinated vinyl chloride resin is within the above range, the chlorine content ratio in the vinyl chloride resin composition can be easily controlled in the proper range to increase the impact resistance, thermal resistance, and chemical resistance of the formed articles in a well-balanced manner.

The content of the particles B derived from the particles A is preferably 1.6 wt % or more, more preferably 1.8 wt % or more, still more preferably 2.4 wt % or more, and preferably 51 wt % or less, more preferably 36 wt % or less in 100 wt % of the vinyl chloride resin composition according to the present invention. The content of the particles B derived from the particles A may be 2.6 wt % or more, or 9 wt % or less, or 6.3 wt % or less in 100 wt % of the vinyl chloride resin composition. When the content of the particles B is equal to or more than the above lower limit, the formed articles have higher impact resistance. When the content of the particles B is equal to or less than the above upper limit, the formed articles have better thermal resistance. The vinyl chloride resin may account for or the chlorinated vinyl chloride resin may account for 100 wt % of the total of the vinyl chloride resin and the chlorinated vinyl chloride resin.

The method for manufacturing the vinyl chloride resin composition according to the present invention includes the step of blending the vinyl chloride resin or the chlorinated vinyl chloride resin with the reaction product X obtained by causing reaction of a material containing the silicone resin polycondensate particles A and the vinyl chloride monomer, to provide a vinyl chloride resin composition containing the reaction product and the chlorinated vinyl chloride resin. The method for manufacturing the vinyl chloride resin composition according to the present invention preferably further includes the step of causing reaction of a material containing the silicone resin polycondensate particles A and the vinyl chloride monomer to provide the reaction product X. In the method for manufacturing the vinyl chloride resin composition according to the present invention, the reaction product X may be obtained without synthesizing the product and the obtained reaction product X may be used to provide a polyvinyl chloride resin composition; alternatively the reaction product X may be synthesized and the synthesized reaction product X may be used to provide a polyvinyl chloride resin composition.

In the method for manufacturing the vinyl chloride resin composition according to the present invention, preferably the reaction product X and the chlorinated vinyl chloride resin are blended to provide a vinyl chloride resin composition containing the reaction product X and the chlorinated vinyl chloride resin and having a chlorine content ratio of 56.5 wt % or more and 65.5 wt % or less. In this case, the vinyl chloride resin may not be used or may be used.

Upon causing reaction of the material containing the silicone resin polycondensate particles A and the vinyl chloride monomer, a scale inhibitor is preferably used. The use of the scale inhibitor can avoid generation of adhering substances to the inside of a polymerization tank, which can advance the reactions more efficiently.

The forming of the vinyl chloride resin composition according to the present invention can provide formed articles.

The method for manufacturing the formed articles preferably includes the step of extruding the above vinyl chloride resin composition with a forming machine. In the method for manufacturing the formed articles, a forming machine having a resin retention part, in which the resin is retained, in a resin passage is preferably used as the forming machine. The formed articles are preferably pipes.

When the vinyl chloride resin composition is formed, additives such as a heat stabilizer, an auxiliary stabilizer, a lubricant, a processing aid, an antioxidant, a light stabilizer, a filler, and a pigment may be optionally added.

The heat stabilizer is not particularly limited, and examples thereof include organotin stabilizers such as dimethyl tin mercapto, dibutyl tin mercapto, dioctyl tin mercapto, dibutyl tin malate, dibutyl tin malate polymer, dioctyl tin malate, dioctyl tin malate polymer, dibutyl tin laurate, and dibutyl tin laurate polymer; lead-based stabilizers such as lead stearate, dibasic lead phosphite, and tribasic lead sulfate; calcium-zinc-based stabilizers; barium-zinc-based stabilizers; and barium-cadmium-based stabilizers. The heat stabilizers may be used singly or may be used in any combination thereof.

The auxiliary stabilizer is not particularly limited, and examples thereof include epoxidized soybean oil, epoxidized linseed oil, epoxidized tetrahydrophthalate, epoxidized polybutadiene, and phosphoric esters. The auxiliary stabilizers may be used singly or may be used in any combination thereof.

The lubricant is not particularly limited, and examples thereof include montanic acid wax, paraffin wax, polyethylene wax, stearic acid, stearyl alcohol, and butyl stearate. The lubricants may be used singly or may be used in any combination thereof.

The processing aid is not particularly limited, and examples thereof include acrylic processing aids of alkyl acrylate/alkyl methacrylate copolymers having a weight average molecular weight of from 100,000 to 2,000,000. Specific examples of the processing aid include a n-butyl acrylate/methyl methacrylate copolymer and a 2-ethylhexyl acrylate/methyl methacrylate/butyl methacrylate copolymer. The processing aids may be used singly or may be used in any combination thereof.

The antioxidant is not particularly limited, and examples thereof include phenolic antioxidants. The antioxidants may be used singly or may be used in any combination thereof.

The light stabilizer is not particularly limited, and examples thereof include ultraviolet absorbers such as salicylic acid ester-based, benzophenone-based, benzotriazole-based, and cyanoacrylate-based ultraviolet absorbers; and hindered amine light stabilizers. The light stabilizers may be used singly or may be used in any combination thereof.

The filler is not particularly limited, and examples thereof include calcium carbonate and talc. The fillers may be used singly or may be used in any combination thereof.

The pigment is not particularly limited, and examples thereof include organic pigments such as azo-based, phthalocyanine-based, threne-based, and dye lake-based pigments; and inorganic pigments such as oxide-based, molybdenum chromate-based, sulfide/selenide-based, and ferrocyanide-based pigments. The pigments may be used singly or may be used in any combination thereof.

In the production of the formed articles, a plasticizer may be added to the vinyl chloride resin composition in order to increase the processability during forming. The plasticizer is not particularly limited, and examples thereof include dibutyl phthalate, di-2-ethylhexyl phthalate, and di-2-ethylhexyl adipate. The plasticizers may be used singly or may be used in any combination thereof.

In the production of the formed articles, a thermoplastic resin which is different from the vinyl chloride resin and different from the chlorinated vinyl chloride resin may be optionally added to the vinyl chloride resin composition. The thermoplastic resins may be used singly or may be used in any combination thereof.

The method for mixing the additive(s) or plasticizer with the vinyl chloride resin composition is not particularly limited, and examples thereof include a hot-blend method and cold-blend method. The method for forming the vinyl chloride resin composition is not particularly limited, and examples thereof include extrusion, injection molding, calendaring, and press-forming.

The forming machine used for forming the vinyl chloride resin composition of the present invention is not particularly limited, and examples thereof include single screw extruders, counter-rotating parallel twin screw extruders, counter-rotating conical twin screw extruders, and co-rotating twin screw extruders.

In forming the vinyl chloride resin composition with the forming machine, the mold used for shaping, the resin temperature, and the like are not particularly limited.

The vinyl chloride resin composition can be processed with favorable fluidity by adding to the vinyl chloride resin composition the lubricant, stabilizer, or pigment that is used for forming processes.

The vinyl chloride resin composition according to the present invention has excellent impact resistance, thermal resistance, and chemical resistance. The vinyl chloride resin composition also has excellent weather resistance. In addition, the vinyl chloride resin composition has characteristics of impact resistance, thermal resistance and chemical resistance in a well-balanced manner.

Therefore, the vinyl chloride resin composition according to the present invention is very useful particularly for pipe materials, tanks, and others that are used for chemical solutions at high temperature. Furthermore, the vinyl chloride resin composition can be suitably used for rigid polyvinyl chloride pipes, plates, or the like that require impact resistance, thermal resistance, and the like in taking advantage of the above characteristics.

The present invention will be described below in more detail by way of Examples. The present invention is not limited only to the following Examples.

Examples 1 to 10

(1) Manufacture of Silicone Resin Polycondensate Particles a

Components (1) shown in Tables 1 and 2 below were mixed at the proportion shown in Tables 1 and 2 below, and the mixture was then emulsified with a homogenizer at 8000 rpm. Next, the resulting emulsion was introduced into a polymerization tank and stirred, and subsequently the gas space in the polymerization tank was replaced with nitrogen. The internal temperature of the polymerization tank was then increased to 85° C. and the reaction was carried out for 5 hours. The internal temperature of the polymerization tank was next decreased to 50° C. over 30 minutes, and the reaction was then carried out at 50° C. for 6 hours. Thereafter, components (2) shown in Tables 1 and 2 below were added into the polymerization tank and allowed to react for 2 hours. Subsequently, the pH was adjusted to 6 to 8 by adding 10 wt % of an aqueous sodium hydroxide solution to provide silicone resin polycondensate particles A having a solid concentration of about 16 to 20 wt %.

(2) Manufacture of Reaction Product X

Components (3) shown in Tables 1 and 2 below were introduced at one time into a reaction vessel (polymerization vessel) equipped with a stirrer and a jacket. The reaction vessel was then evacuated with a vacuum pump, and further vinyl chloride serving as a component (4) shown in Tables 1 and 2 below was introduced into the reaction vessel under stirring. Next, the polymerization was initiated at the polymerization temperature shown in Tables 1 and 2 below while the jacket temperature was controlled. The reaction was terminated after the completion of the reaction was confirmed by the fact that the internal pressure of the reaction vessel decreased to a predetermined pressure. Subsequently, unreacted vinyl chloride was removed, followed by further dehydration and drying to provide reaction products X of the silicone resin polycondensate particles A and polyvinyl chloride.

(3) Manufacture of Vinyl Chloride Resin Composition

The obtained reaction product X and a post-chlorinated vinyl chloride resin (produced by Tokuyama Sekisui Co. Ltd., "HA-58K: chlorine content ratio 67.3 wt %, degree of polymerization 1000 type") were blended so that the contents of the post-chlorinated vinyl chloride resin, polyvinyl chloride (vinyl chloride resin), and particles B in the vinyl chloride resin composition to be obtained were as shown in Tables 1 and 2 below, to provide vinyl chloride resin compositions.

Examples 11 to 13

Reaction products X were obtained in the same manner as in Example 1 except that the kinds and proportion of the components used for manufacturing the silicone resin polycondensate particles A and for manufacturing the reaction product X were changed as shown in Table 2 below. In Examples 11 to 13, the components (2) shown in Table 2 below were not blended.

The obtained reaction product X and a post-chlorinated vinyl chloride resin (produced by Tokuyama Sekisui Co. Ltd., "HA-58K: chlorine content ratio 67.3 wt %, degree of polymerization 1000 type") were blended so that the contents of the post-chlorinated vinyl chloride resin, polyvinyl chloride (vinyl chloride resin), and particles B in the vinyl chloride resin composition to be obtained were as shown in Table 2 below, to provide vinyl chloride resin compositions.

Evaluation on Examples 1 to 13

(1) Particle Size of Silicone Resin Polycondensate Particles A

The particle size of the silicone resin polycondensate particles A was measured with a light-scattering spectrophotometer (light-scattering spectrophotometer DLS-7000: produced by Otsuka Electronics Co., Ltd.).

(2) Solid Concentration of Silicone Resin Polycondensate Particles a

About 5 g (weight: B g) of the silicone resin polycondensate particles A were weighted and introduced into an aluminum container (weight: A g) whose weight was measured in advance, and then dried at 70° C. for 24 hours. After drying, the weight of the residual solid content including the aluminum container was measured (weight: C g) to calculate the solid concentration of the silicone resin polycondensate particles A according to an equation (W) below.

Solid concentration of silicone resin polycondensate particles $A$ (wt %)=$(C-A)/B \times 100$  Equation (W)

(3) Degree of Polymerization of Polyvinyl Chloride in Reaction Product X

The degree of polymerization of polyvinyl chloride in the reaction product X was measured according to JIS K6720-2. It is noted that insoluble materials generated were separated by filtering and only soluble materials were used for the measurement.

(4) Content D of Silicone Resin Polycondensate Particles B and Content E of Polyvinyl Chloride in Reaction Product X The chlorine weight content ratio (C1%) in the reaction product X was measured by potentiometric titration according to JIS K7229. From this chlorine weight content ratio (C=C1%/100), the content D of the silicone resin polycondensate particles B was calculated according to an equation (X) below.

Content $D$ (wt %) of Silicone Resin Polycondensate Particles $B$=$(1-1.762 \times C) \times 100$  Equation (X)

In addition, the content E of polyvinyl chloride was calculated from the content D of the silicone resin polycondensate particles B.

(5) Content F of Silicone Resin Polycondensate Particles B in Vinyl Chloride Resin Composition About 10 g (hereinafter designated as W1 g) of the vinyl chloride resin composition was weighted and mixed in 100 mL of tetrahydrofuran (THF) under stirring for 50 hours. Subsequently, an insoluble portion in THF was precipitated from a THF solution by centrifugation, and the insoluble portion was dried at 70° C. for 24 hours. The obtained dry material was weighted (hereinafter designated as W2 g), and furthermore the chlorine content ratio (hereinafter designated as C %) was determined. From these results, the content F of the silicone resin polycondensate particles B was calculated according to an equation (Y) below.

Content $F$ (wt %) of silicone resin polycondensate particles $B$=$W2(1-1.762 \times C)/W1 \times 100$  Equation (Y)

(6) Measurement of Chlorine Content Ratio in Vinyl Chloride Resin Composition

The chlorine weight content ratio (C1%) in the vinyl chloride resin composition was measured by potentiometric titration according to JIS K7229.

(7) 23° C. Charpy Impact Value

A resin material obtained by mixing 2.0 parts by weight of organotin stabilizer and 0.5 parts by weight of polyethylene wax with 100 parts by weight of the vinyl chloride resin composition was subjected to roll kneading at 200° C. for 3 minutes, and further press forming at 205° C. for 3 minutes to prepare a press plate having a thickness of 3 mm. The obtained press plate was used as a measurement sample to prepare a test piece, i.e., an edgewise impact test piece (No. 1 test piece, notch A), according to JIS K7111, and the Charpy impact value was measured. After the measurement sample was kept in a thermostatic bath at 23° C. for 12 hours, the Charpy impact value was measured at 23° C.

(8) 23° C. Tension Tensile Strength

The press plate prepared for measuring the Charpy impact value was used as a measurement sample, and the tensile yield strength was measured according to the tensile test method for plastics (JIS K7113) with No. 1 type test piece at 10 mm/minute. The measurement temperature was 23° C. and the unit of the tension tensile strength was MPa.

(9) Vicat Softening Temperature

The press plate prepared for measuring the Charpy impact value was used as a measurement sample, and the Vicat softening temperature was measured according to JIS K7206 (load: 5 kgf).

(10) Weight Change Rate by Immersion in 97% Sulfuric Acid

A resin material was prepared by adding 1.0 part by weight of organotin stabilizer and 0.3 parts by weight of polyethylene wax to 100 parts by weight of the vinyl chloride resin composition and mixing them. This resin material was subjected to roll kneading at 195° C. for 3 minutes, and further press forming at 200° C. for 3 minutes to prepare a press plate having a thickness of 3 mm. The obtained press plate was cut out into a 2.5-cm square, and the edge faces thereof were polished to provide a sample for immersion. After the sample for immersion was weighted (A g) in advance, the sample for immersion was placed in a glass container containing 97% sulfuric acid, and the glass container was covered with a glass drop lid from the top so that the entire sample for immersion was immersed in 97% sulfuric acid, followed by sealing of the glass container. The sample for immersion was then allowed to stand for 14 days while being immersed in 97% sulfuric acid. After 14 days, the immersed sample was taken out and washed with water lightly, followed by wiping out of surface water. The sample after the immersion was then weighed (B g). From these results, the weight change rate by immersion in 97% sulfuric acid was calculated according to an equation (Z) below.

Weight change rate (%) by immersion in 97% sulfuric acid=—$(B-A)/A\times100$   Equation (Z)

The results are shown in Tables 1 and 2 below.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Silicone resin polycondensate particles A | | | | | | | | | |
| Compo-nents | (1) Ion-exchanged water | | 400 | 400 | 400 | 400 | 400 | 400 | 400 |
|  | (1) Octamethylcyclotetrasiloxane | | 100 | 100 | 100 | 100 | 100 | 100 | 100 |
|  | (1) Tetraethoxysilane | | 3 | 3 | 3 | 3 | 7 | — | 3 |
|  | (1) Methyltriethoxysilane | | — | — | — | — | — | 4 | — |
|  | (1) Vinyltriethoxysilane | | 7 | 7 | 7 | 7 | 3 | 7 | 7 |
|  | (1) Dodecylbenzenesulfonic acid | | 1 | 1 | 1 | 1 | 1 | 1 | 1 |
|  | (2) Trimethylethoxysilane | | 0.5 | 3 | 5 | 3 | 3 | 3 | — |
|  | (2) Hexamethyldisiloxane | | — | — | — | — | — | — | 0.28 |
|  | (2) Hexamethyldisilazane | | — | — | — | — | — | — | — |
| Evalu-ation | Particle size | [µm] | 0.12 | 0.12 | 0.12 | 0.12 | 0.12 | 0.12 | 0.12 |
|  | Solid concentration | [wt %] | 19.6 | 19.6 | 19.6 | 19.6 | 19.6 | 19.6 | 19.6 |
| Reaction product X | | | | | | | | | |
| Polymerization temperature | | [° C.] | 64 | 64 | 64 | 64 | 64 | 64 | 64 |
| Pressure after reaction completion | | [MPa] | 0.52 | 0.52 | 0.52 | 0.52 | 0.52 | 0.52 | 0.52 |
| Compo-nents | (3) Silicone resin polycondensate particles *1 | | 80.0 | 80.0 | 80.0 | 50.0 | 50.0 | 80.0 | 80.0 |
|  | (3) Ion-exchanged water *2 | | 210 | 210 | 210 | 210 | 210 | 210 | 210 |
|  | (3) Ammonium persulfate | | 0.15 | 0.15 | 0.15 | 0.15 | 0.15 | 0.15 | 0.15 |
|  | (4) Vinyl chloride | | 20 | 20 | 20 | 50 | 50 | 20 | 20 |
| Evalu-ation | Degree of polymerization of polyvinyl chloride | | 453 | 453 | 453 | 458 | 458 | 453 | 453 |
|  | Content D of silicone resin polycondensate particles B | [wt %] | 80.2 | 81.0 | 80.0 | 52.0 | 50.0 | 80.8 | 81.4 |
|  | Content E of polyvinyl chloride | [wt %] | 19.8 | 19.0 | 20.0 | 48.0 | 50.0 | 19.2 | 18.6 |
| Vinyl chloride resin composition | | | | | | | | | |
| Compo-sition/charac-teristics | Chlorine content ratio in chlorinated vinyl chloride resin | [wt %] | 67.3 | 67.3 | 67.3 | 67.3 | 67.3 | 67.3 | 67.3 |
|  | Degree of polymerization of chlorinated vinyl chloride resin | | 990 | 990 | 990 | 990 | 990 | 990 | 990 |
|  | Content of chlorinated vinyl chloride resin | [wt %] | 94.1 | 94.1 | 94.1 | 90.8 | 90.5 | 94.1 | 94.2 |
|  | Content of vinyl chloride resin | [wt %] | 1.18 | 1.12 | 1.19 | 4.39 | 4.76 | 1.13 | 1.09 |
|  | Content F of silicone resin polycondensate particles B | [wt %] | 4.76 | 4.76 | 4.76 | 4.76 | 4.76 | 4.76 | 4.76 |
|  | Content of reaction product X | [wt %] | 5.94 | 5.88 | 5.95 | 9.15 | 9.52 | 5.89 | 5.85 |
|  | Chlorine content ratio in vinyl chloride resin composition | [wt %] | 64.0 | 64.0 | 64.0 | 63.6 | 63.6 | 64.0 | 64.0 |
| Evalu-ation | 23° C. Charpy impact value | [kJ/m²] | 4.9 | 8.4 | 8.0 | 10.6 | 10.0 | 7.4 | 5.0 |
|  | 23° C. Tension tensile strength | [MPa] | 55.0 | 62.8 | 62.0 | 60.0 | 61.0 | 61.0 | 56.1 |
|  | Vicat softening temperature | [° C.] | 116.1 | 118.6 | 118.5 | 118.1 | 117.8 | 117.5 | 115.8 |
|  | Weight change rate by immersion in 97% sulfuric acid | [%] | 0.33 | 0.3 | 0.32 | 0.31 | 0.31 | 0.33 | 0.32 |

*1 The proportion of the silicone resin polycondensate particles represents parts by weight of the solid content.
*2 including water in which the silicone resin polycondensate particles are dispersed.
* The unit of the content of each component blended is part by weight.

TABLE 2

|  |  | Ex. 8 | Ex. 9 | Ex. 10 | Ex. 11 | Ex. 12 | Ex. 13 |
|---|---|---|---|---|---|---|---|
| Silicone resin polycondensate particles A | | | | | | | |
| Compo-nents | (1) Ion-exchanged water | 400 | 400 | 400 | 400 | 400 | 400 |
|  | (1) Octamethylcyclotetrasiloxane | 100 | 100 | 100 | 100 | 100 | 100 |
|  | (1) Tetraethoxysilane | 3 | 3 | 3 | 3 | 3 | 3 |
|  | (1) Methyltriethoxysilane | — | — | — | — | — | — |
|  | (1) Vinyltriethoxysilane | 7 | 7 | 7 | 7 | 7 | 7 |
|  | (1) Dodecylbenzenesulfonic acid | 1 | 1 | 1 | 1 | 1 | 1 |
|  | (2) Trimethylethoxysilane | — | — | — | — | — | — |

TABLE 2-continued

|  |  |  | Ex. | | | | | |
|---|---|---|---|---|---|---|---|---|
|  |  |  | 8 | 9 | 10 | 11 | 12 | 13 |
|  | (2) Hexamethyldisiloxane |  | 1.7 | — | — | — | — | — |
|  | (2) Hexamethyldisilazane |  | — | 0.25 | 1.5 | — | — | — |
| Evaluation | Particle size | [μm] | 0.12 | 0.12 | 0.12 | 0.14 | 0.14 | 0.14 |
|  | Solid concentration | [wt %] | 19.6 | 19.6 | 19.6 | 19.2 | 19.2 | 19.2 |
|  |  | Reaction product X | | | | | | |
| Polymerization temperature |  | [° C.] | 64 | 64 | 64 | 64 | 64 | 64 |
| Pressure after reaction completion |  | [MPa] | 0.52 | 0.52 | 0.52 | 0.52 | 0.52 | 0.52 |
| Components | (3) Silicone resin polycondensate particles *1 |  | 80.0 | 80.0 | 80.0 | 30.0 | 50.0 | 80.0 |
|  | (3) Ion-exchanged water *2 |  | 210 | 210 | 210 | 210 | 210 | 210 |
|  | (3) Ammonium persulfate |  | 0.15 | 0.15 | 0.15 | 0.15 | 0.15 | 0.15 |
|  | (4) Vinyl chloride |  | 20 | 20 | 20 | 100 | 100 | 100 |
| Evaluation | Degree of polymerization of polyvinyl chloride |  | 453 | 453 | 453 | 462 | 462 | 462 |
|  | Content D of silicone resin polycondensate particles B | [wt %] | 81.5 | 80.6 | 80.8 | 28.0 | 52.5 | 81.9 |
|  | Content E of polyvinyl chloride | [wt %] | 18.5 | 19.4 | 19.2 | 72.0 | 47.5 | 18.1 |
|  |  | Vinyl chloride resin composition | | | | | | |
| Composition/ characteristics | Chlorine content ratio in chlorinated vinyl chloride resin | [wt %] | 67.3 | 67.3 | 67.3 | 67.3 | 67.3 | 67.3 |
|  | Degree of polymerization of chlorinated vinyl chloride resin |  | 990 | 990 | 990 | 990 | 990 | 990 |
|  | Content of chlorinated vinyl chloride resin | [wt %] | 94.2 | 94.1 | 94.1 | 83.0 | 90.9 | 94.2 |
|  | Content of vinyl chloride resin | [wt %] | 1.08 | 1.15 | 1.13 | 12.24 | 4.31 | 1.05 |
|  | Content F of silicone resin polycondensate particles B | [wt %] | 4.76 | 4.76 | 4.76 | 4.76 | 4.76 | 4.76 |
|  | Content of reaction product X | [wt %] | 5.84 | 5.91 | 5.89 | 17.00 | 9.07 | 5.81 |
|  | Chlorine content ratio in vinyl chloride resin composition | [wt %] | 64.0 | 64.0 | 64.0 | 62.8 | 63.6 | 64.0 |
| Evaluation | 23° C. Charpy impact value | [kJ/m$^2$] | 8.2 | 5.1 | 8.0 | 20.9 | 4.5 | 3.7 |
|  | 23° C. Tension tensile strength | [MPa] | 61.8 | 54.8 | 62.1 | 54.4 | 52.1 | 55.4 |
|  | Vicat softening temperature | [° C.] | 118.3 | 116.4 | 118.5 | 102 | 102.2 | 101.9 |
|  | Weight change rate by immersion in 97% sulfuric acid | [%] | 0.31 | 0.31 | 0.3 | 0.31 | 0.32 | 0.3 |

*1 The proportion of the silicone resin polycondensate particles represents parts by weight of the solid content.
*2 including water in which the silicone resin polycondensate particles are dispersed.
* The unit of the content of each component blended is part by weight.

Examples 14 and 15

(1) Manufacture of Silicone Resin Polycondensate Particles A

Components (1) shown in Table 3 below were mixed at the proportion shown in Table 3 below, and the mixture was then emulsified with a homogenizer at 8000 rpm. Next, the resulting emulsion was introduced into a polymerization tank and stirred, and subsequently the gas space in the polymerization tank was replaced with nitrogen. The internal temperature of the polymerization tank was then increased to 85° C. and the reaction was carried out for 5 hours. The internal temperature of the polymerization tank was next decreased to 50° C. over 30 minutes, and the reaction was then carried out at 50° C. for 6 hours. Thereafter, components (2) shown in Table 3 below were added into the polymerization tank and allowed to react for 2 hours. Subsequently, the pH was adjusted to 6 to 8 by adding 10 wt % of an aqueous sodium hydroxide solution to provide silicone resin polycondensate particles A having a solid concentration of about 16 to 20 wt %.

(2) Manufacture of Substance Produced by Reaction Before Washing

Components (3) shown in Table 3 below were introduced at one time into a reaction vessel (polymerization vessel) equipped with a stirrer and a jacket. The reaction vessel was then evacuated with a vacuum pump, and further vinyl chloride serving as a component (4) shown in Table 3 below was introduced into the reaction vessel under stirring. Next, the polymerization was initiated at the polymerization temperature shown in Table 3 below while the jacket temperature was controlled. The reaction was terminated after the completion of the reaction was confirmed by the fact that the internal pressure of the reaction vessel decreased to a predetermined pressure. Subsequently, unreacted vinyl chloride was removed, followed by further dehydration and drying to provide a substance produced by reaction (reaction product before washing) of the silicone resin polycondensate particles A and polyvinyl chloride.

(3) Manufacture of Reaction Product X

Five grams of the obtained substance produced by reaction (the amount of the substance produced by reaction used before washing) was immersed in 300 mL of THF and stirred at 23° C. for 12 hours. The swelled substance produced by reaction was then recovered by filtering through a metal net (400 mesh, SUS316) and dried to provide reaction products X of the silicone resin polycondensate particles A and polyvinyl chloride. The gel fraction of the obtained reaction product X calculated according to an equation (K) below was the value shown in Table 3 below.

Gel fraction=(amount (g) of obtained reaction productx)/(amount (g) of substance produced by reaction used before washing)   Equation (K)

(4) Manufacture of Vinyl Chloride Resin Composition

The obtained reaction product X and a post-chlorinated vinyl chloride resin (produced by Tokuyama Sekisui Co. Ltd., "HA-58K: chlorine content ratio 67.3 wt %, degree of polymerization 1000 type") were blended so that the contents of the post-chlorinated vinyl chloride resin, polyvinyl chloride (vinyl chloride resin), and particles B in the vinyl chloride resin composition to be obtained were as shown in Table 3 below to provide vinyl chloride resin compositions.

Example 16

(1) Manufacture of Silicone Resin Polycondensate Particles A

Components (1) shown in Table 3 below were mixed at the proportion shown in Table 3 below, and the mixture was then emulsified with a homogenizer at 8000 rpm. Next, the resulting emulsion was introduced into a polymerization tank and stirred, and subsequently the gas space in the polymerization tank was replaced with nitrogen. The internal temperature of the polymerization tank was then increased to 85° C. and the reaction was carried out for 5 hours. The internal temperature of the polymerization tank was next decreased to 50° C. over 30 minutes, and the reaction was then carried out at 50° C. for 6 hours. Thereafter, components (2) shown in Table 3 below were added into the polymerization tank and allowed to react for 2 hours. Subsequently, the pH was adjusted to 6 to 8 by adding 10 wt % of an aqueous sodium hydroxide solution to provide silicone resin polycondensate particles A having a solid concentration of about 16 to 20 wt %.

(2) Manufacture of Reaction Product X

Components (3) shown in Table 3 below were introduced at one time into a reaction vessel (polymerization vessel) equipped with a stirrer and a jacket. The reaction vessel was then evacuated with a vacuum pump, and further vinyl chloride serving as a component (4) shown in Table 3 below was introduced into the reaction vessel under stirring. Next, the polymerization was initiated at the polymerization temperature shown in Table 3 below while the jacket temperature was controlled. The reaction was terminated after the completion of the reaction was confirmed by the fact that the internal pressure of the reaction vessel decreased to a predetermined pressure. Subsequently, unreacted vinyl chloride was removed, followed by further dehydration and drying to provide a reaction product X of the silicone resin polycondensate particles A and polyvinyl chloride.

(3) Manufacture of Vinyl Chloride Resin Composition

The obtained reaction product X and a post-chlorinated vinyl chloride resin (produced by Tokuyama Sekisui Co. Ltd., "HA-58K: chlorine content ratio 67.3 wt %, degree of polymerization 1000 type") were blended so that the contents of the post-chlorinated vinyl chloride resin, polyvinyl chloride (vinyl chloride resin), and particles B in the vinyl chloride resin composition to be obtained were as shown in Table 3 below to provide a vinyl chloride resin composition.

Evaluation on Examples 14 to 16

The reaction products X and the vinyl chloride resin compositions obtained in Examples 14 to 16 were evaluated in the same manner as in Example 1.

The results are shown in Table 3 below.

TABLE 3

| | | | Ex. 14 | Ex. 15 | Ex. 16 |
|---|---|---|---|---|---|
| Silicone resin polycondensate particles A | | | | | |
| Components | (1) Ion-exchanged water | | 400 | 400 | 400 |
| | (1) Octamethylcyclotetrasiloxane | | 100 | 100 | 100 |
| | (1) Tetraethoxysilane | | 3 | 3 | 3 |
| | (1) Methyltriethoxysilane | | — | — | — |
| | (1) Vinyltriethoxysilane | | 7 | 7 | 7 |
| | (1) Dodecylbenzenesulfonic acid | | 1 | 1 | 1 |
| | (2) Trimethylethoxysilane | | 3 | 3 | 3 |
| | (2) Hexamethyldisiloxane | | — | — | — |
| | (2) Hexamethyldisilazane | | — | — | — |
| Evaluation | Particle size | [µm] | 0.12 | 0.12 | 0.12 |
| | Solid concentration | [wt %] | 19.6 | 19.6 | 19.6 |
| Reaction product before washing | | | | | |
| Polymerization temperature | | [° C.] | 64 | 64 | 64 |
| Pressure after reaction completion | | [MPa] | 0.52 | 0.52 | 0.52 |
| Components | (3) Silicone resin polycondensate particles *1 | | 80.0 | 80.0 | 80.0 |
| | (3) Ion-exchanged water *2 | | 210 | 210 | 210 |
| | (3) Ammonium persulfate | | 0.15 | 0.15 | 0.15 |
| | (4) Vinyl chloride | | 20 | 20 | 20 |
| Evaluation | Degree of polymerization of polyvinyl chloride | | 453 | 453 | 453 |
| | Content D of silicone resin polycondensate particles B | [wt %] | 35.0 | 35.0 | 35.0 |
| | Content E of polyvinyl chloride | [wt %] | 65.0 | 65.0 | 65.0 |
| Reaction product X (filtered substance) | | | | | |
| Evaluation | Gel fraction | | 39 | 39 | — |
| | Degree of polymerization of polyvinyl chloride | | 453 | 453 | — |

TABLE 3-continued

|  |  |  | Ex. | | |
| --- | --- | --- | --- | --- | --- |
|  |  |  | 14 | 15 | 16 |
|  | Content D of silicone resin polycondensate particles B | [wt %] | 49.0 | 49.0 | — |
|  | Content E of polyvinyl chloride | [wt %] | 51.0 | 51.0 | — |
|  | Vinyl chloride resin composition |  |  |  |  |
| Composition/characteristics | Chlorine content ratio in chlorinated vinyl chloride resin | [wt %] | 67.3 | 67.3 | 67.3 |
|  | Degree of polymerization of chlorinated vinyl chloride resin |  | 990 | 990 | 990 |
|  | Content of chlorinated vinyl chloride resin | [wt %] | 93.0 | 88.3 | 91.3 |
|  | Content of vinyl chloride resin | [wt %] | 4.05 | 6.92 | 5.79 |
|  | Content F of silicone resin polycondensate particles B | [wt %] | 2.91 | 4.75 | 2.91 |
|  | Content of reaction product X | [wt %] | 6.96 | 11.67 | 8.70 |
|  | Chlorine content ratio in vinyl chloride resin composition | [wt %] | 64.9 | 63.5 | 64.8 |
| Evaluation | 23° C. Charpy impact value | [kJ/m$^2$] | 9.8 | 17.9 | 4.7 |
|  | 23° C. Tension tensile strength | [MPa] | 59.2 | 54.1 | 62.0 |
|  | Vicat softening temperature | [° C.] | 117.1 | 115.2 | 116.3 |
|  | Weight change rate by immersion in 97% sulfuric acid | [%] | 0.30 | 0.32 | 0.30 |

\*1 The proportion of the silicone resin polycondensate particles represents parts by weight of the solid content.
\*2 including water in which the silicone resin polycondensate particles are dispersed.
\* The unit of the content of each component blended is part by weight.

Examples 17 to 38

(1) Manufacture of Silicone Resin Polycondensate Particles A

Formulations shown in Tables 4 to 6 below were mixed at the proportion shown in Tables 4 to 6 below, and the mixture was then emulsified with a homogenizer at 8000 rpm. Next, the resulting emulsion was introduced into a polymerization tank and stirred, and subsequently the gas space in the polymerization tank was replaced with nitrogen. The polymerization was then carried out under any one of two patterns of the temperature conditions (pattern α: the internal temperature of the polymerization tank was increased to 85° C. and the reaction was then carried out for 3 hours, and the internal temperature of the polymerization tank was decreased to 50° C. over 30 minutes and the reaction was then carried out at 50° C. for 4.5 hours; pattern β: the internal temperature of the polymerization tank was increased to 90° C. and the reaction was carried out for 6 hours). Subsequently, the pH was adjusted to 6 to 8 by adding 10 wt % of an aqueous sodium hydroxide solution to provide silicone resin polycondensate particles A having a solid concentration of about 16 to 20 wt %.

(2) Manufacture of Reaction Product X

The formulations except for vinyl chloride shown in Tables 4 to 6 below were introduced at one time into a reaction vessel (polymerization vessel) equipped with a stirrer and a jacket. The reaction vessel was then evacuated with a vacuum pump, and further vinyl chloride was introduced into the reaction vessel under stirring. Next, the polymerization was then initiated at the polymerization temperature shown in Tables 4 to 6 below while the jacket temperature was controlled. The reaction was terminated after the completion of the reaction was confirmed by the fact that the internal pressure of the reaction vessel decreased to a predetermined pressure. Subsequently, unreacted vinyl chloride was removed, followed by further dehydration and drying to provide reaction products X of the silicone resin polycondensate particles A and polyvinyl chloride.

(3) Manufacture of Vinyl Chloride Resin Composition

The obtained reaction product X and a post-chlorinated vinyl chloride resin (produced by Tokuyama Sekisui Co. Ltd., "HA-58K: chlorine content ratio 67.3 wt %, degree of polymerization 1000 type", "HA-54H: chlorine content ratio 65.4 wt %, degree of polymerization 1000 type", or "HA-54F: chlorine content ratio 64.0 wt %, degree of polymerization 1000 type") were blended so that the contents of the post-chlorinated vinyl chloride resin, polyvinyl chloride, and particles B in the vinyl chloride resin composition to be obtained were as shown in Tables 4 to 6 below to provide vinyl chloride resin compositions.

Comparative Examples 1 to 3

Reaction products X and vinyl chloride resin compositions were obtained in the same manner as in Example 17 except that the kinds and proportion of the formulations used for manufacturing the silicone resin polycondensate particles and for manufacturing the reaction product were changed as shown in Table 7 below.

Evaluation on Examples 17 to 38 and Comparative Examples 1 to 3

The reaction products X and the vinyl chloride resin compositions obtained in Examples 17 to 38 and Comparative Examples 1 to 3 were evaluated for evaluation items (1), (2), (3), (4), (5), (8), and (10) mentioned above in the same manner as in Example 1. They were also further evaluated for evaluation items (11), (12), and (13) described below.

(11) Graft Rate

About 10 g (hereinafter designated as W1 g) of the reaction product X was weighted and mixed in 100 mL of tetrahydrofuran (THF) under stirring for 50 hours. Subsequently, an insoluble portion in THF was separated from a THF solution through a metal net with 200 mesh, and dried at 70° C. for a day and night. The obtained dry material was weighted (hereinafter designated as W2 g), and the chlorine content ratio (hereinafter designated as C %) was further determined. From these results, the graft rate was calculated by an equation (L) below and the content D (wt %) of the silicone resin polycondensate particles B calculated from the formula (X) above.

Graft rate(wt %)=[{($C \times W2/56.8$)×100}/{$W1-W2(1-C/56.8)$}]/x    Equation (L)

(7) 0° C. Charpy Impact Value

A resin material obtained by mixing 1.0 part by weight of organotin stabilizer and 0.3 parts by weight of polyethylene wax with 100 parts by weight of the reaction product X was subjected to roll kneading at 195° C. for 3 minutes, and further press forming at 200° C. for 3 minutes to prepare a press plate having a thickness of 3 mm. The obtained press plate was used as a measurement sample to prepare a test piece, i.e., an edgewise impact test piece (No. 1 test piece, notch A) according to JIS K7111, and the Charpy impact value was measured. The measurement sample was kept in a thermostatic bath at 0° C. for 12 hours, and the Charpy impact value was measured at 23° C. within 10 seconds after the measurement sample was taken out of the thermostatic bath.

(13) Extrusion Appearance

To 100 parts by weight of the reaction product X were added 1 part by weight of dioctyl tin mercapto as an organotin-based stabilizer, 0.5 parts by weight of polyethylene wax as a lubricant, 0.5 parts by weight of ester-based wax, and 1.5 parts by weight of PMMA-based processing aid. The mixture was stirred and mixed with SUPERMIXER (100 L, produced by Kawata Mfg Co., Ltd.) to provide a vinyl chloride composition material.

This vinyl chloride composition material was supplied to a counter-rotating twin screw extruder with 20 mm in diameter (produced by Brabender) and formed at a resin temperature of 195° C. to provide a plate-formed article with 30 mm in width, 3 mm in thickness, and about 100 mm in length. The appearance of the obtained formed article was visually evaluated and rated under the following criteria of three scales.

[Criteria of Extrusion Appearance]
○: Smooth surface
Δ: Surface with small unevenness
X: Surface with significant large unevenness The results are shown in Tables 4 to 7.

TABLE 4

| | | | Ex. | | | | | | | |
|---|---|---|---|---|---|---|---|---|---|---|
| | | | 17 | 18 | 19 | 20 | 21 | 22 | 23 | 24 |
| Silicone resin polycondensate particles A | | | | | | | | | | |
| Components | Ion-exchanged water | | 400 | 400 | 400 | 400 | 400 | 400 | 400 | 400 |
| | Octamethylcyclotetrasiloxane | | 100 | 100 | 100 | 100 | 100 | 100 | 100 | 100 |
| | Tetraethoxysilane | | 5 | 5 | 5 | — | — | 5 | 3 | 7 |
| | Tetramethoxysilane | | — | — | — | 5 | — | — | — | — |
| | Methyltriethoxysilane | | — | — | — | — | 5 | — | — | — |
| | Vinyltriethoxysilane | | 5 | — | — | 5 | 5 | 5 | 3 | 5 |
| | Vinyltrimethoxysilane | | — | 5 | — | — | — | — | — | — |
| | Allyltrimethoxysilan | | — | — | 3 | — | — | — | — | — |
| | 3-Methacryloyloxypropyltriethoxysilane | | — | — | — | — | — | — | — | — |
| | Dodecylbenzenesulfonic acid | | 1 | 1 | 1 | 1 | 1 | 1 | 1 | 1 |
| Pattern of polymerization temperature | | | α | α | α | α | α | β | α | α |
| Evaluation | Particle size | [μm] | 0.17 | 0.15 | 0.14 | 0.14 | 0.14 | 0.16 | 0.14 | 0.13 |
| | Solid concentration | [wt %] | 19.2 | 19.4 | 19.3 | 19.3 | 19.3 | 18.6 | 18.8 | 18.6 |
| Reaction product X | | | | | | | | | | |
| Polymerization temperature | | [° C.] | 53.6 | 53.6 | 53.6 | 53.6 | 53.6 | 53.6 | 53.6 | 53.6 |
| Pressure after reaction completion | | [MPa] | 0.52 | 0.52 | 0.52 | 0.52 | 0.52 | 0.52 | 0.52 | 0.52 |
| Components | Silicone resin polycondensate particles *1 | | 4.6 | 4.6 | 4.6 | 4.6 | 4.6 | 4.6 | 4.6 | 4.6 |
| | Ion-exchanged water *2 | | 210 | 210 | 210 | 210 | 210 | 210 | 210 | 210 |
| | Partially saponified polyvinyl acetate | | 0.2 | 0.2 | 0.2 | 0.2 | 0.2 | 0.2 | 0.2 | 0.2 |
| | Hydroxypropyl methylcellulose | | 0.2 | 0.2 | 0.2 | 0.2 | 0.2 | 0.2 | 0.2 | 0.2 |
| | Aluminum sulfate | | 0.3 | 0.3 | 0.3 | 0.3 | 0.3 | 0.3 | 0.3 | 0.3 |
| | t-Butyl peroxyneodecanoate | | 0.05 | 0.05 | 0.05 | 0.05 | 0.05 | 0.05 | 0.05 | 0.05 |
| | t-Cumyl peroxyneodecanoate | | 0.05 | 0.05 | 0.05 | 0.05 | 0.05 | 0.05 | 0.05 | 0.05 |
| | Vinyl chloride | | 100 | 100 | 100 | 100 | 100 | 100 | 100 | 100 |
| Vinyl chloride resin composition | | | | | | | | | | |
| Composition/characteristics | Degree of polymerization of chlorinated vinyl chloride resin | | 766 | 945 | 960 | 818 | 850 | 869 | 943 | 975 |
| | Content of chlorinated vinyl chloride | [wt %] | 94.6 | 94.6 | 94.7 | 94.6 | 94.6 | 94.6 | 94.6 | 94.5 |
| | Content F of silicone resin polycondensate particles B | [wt %] | 5.4 | 5.4 | 5.3 | 5.4 | 5.4 | 5.4 | 5.4 | 5.5 |
| | Graft rate | [wt %] | 1.9 | 1.8 | 1.2 | 2.3 | 1.7 | 2.6 | 1.8 | 2.0 |

TABLE 4-continued

|  |  |  | Ex. | | | | | | | |
|---|---|---|---|---|---|---|---|---|---|---|
|  |  |  | 17 | 18 | 19 | 20 | 21 | 22 | 23 | 24 |
| Evaluation | 0° C. Charpy impact value | [kJ/m$^2$] | 21.1 | 20.8 | 19.8 | 20.1 | 16.7 | 16.8 | 16.2 | 19.2 |
|  | 23° C. Tension tensile strength | [MPa] | 45.2 | 45.7 | 45.9 | 45.5 | 45.6 | 45.5 | 46.0 | 45.2 |
|  | Weight change rate by immersion in 97% sulfuric acid | [%] | 0.03 | 0.15 | 0.21 | 0.04 | 0.04 | 2.12 | 0.33 | 0.30 |
|  | Extrusion appearance |  | ○ | ○ | ○ | ○ | ○ | ○ | ○ | ○ |

*1 The proportion of the silicone resin polycondensate particles represents parts by weight of the solid content.
*2 including water in which the silicone resin polycondensate particles are dispersed.
* The unit of the content of each component blended is part by weight.

TABLE 5

|  |  |  | Ex. | | | | | | |
|---|---|---|---|---|---|---|---|---|---|
|  |  |  | 25 | 26 | 27 | 28 | 29 | 30 | 31 |
| Silicone resin polycondensate particles A | | | | | | | | | |
| Components | Ion-exchanged water |  | 400 | 400 | 400 | 400 | 400 | 400 | 400 |
|  | Octamethylcyclotetrasiloxane |  | 100 | 100 | 100 | 100 | 100 | 100 | 100 |
|  | Tetraethoxysilane |  | 3 | 7 | 7 | 7 | 7 | 7 | 7 |
|  | Tetramethoxysilane |  | — | — | — | — | — | — | — |
|  | Methyltriethoxysilane |  | — | — | — | — | — | — | — |
|  | Vinyltriethoxysilane |  | 5 | 3 | 3 | 3 | 3 | 3 | 7 |
|  | Vinyltrimethoxysilane |  | — | — | — | — | — | — | — |
|  | Allyltrimethoxysilan |  | — | — | — | — | — | — | — |
|  | 3-Methacryloyloxypropyltriethoxysilane |  | — | — | — | — | — | — | — |
|  | Dodecylbenzenesulfonic acid |  | 1 | 1 | 1 | 1 | 1 | 1 | 1 |
| Pattern of polymerization temperature | | | α | α | α | α | α | α | α |
| Evaluation | Particle size | [μm] | 0.14 | 0.17 | 0.17 | 0.17 | 0.17 | 0.17 | 0.16 |
|  | Solid concentration | [wt %] | 18.6 | 19.2 | 19.2 | 19.2 | 19.2 | 19.2 | 19.9 |
| Reaction product X | | | | | | | | | |
| Polymerization temperature | | [° C.] | 53.6 | 53.6 | 53.6 | 53.6 | 53.6 | 53.6 | 53.6 |
| Pressure after reaction completion | | [MPa] | 0.52 | 0.52 | 0.52 | 0.52 | 0.52 | 0.52 | 0.52 |
| Components | Silicone resin polycondensate particles *1 |  | 4.6 | 4.6 | 2.7 | 2.7 | 7.5 | 12.8 | 4.6 |
|  | Ion-exchanged water *2 |  | 210 | 210 | 210 | 210 | 210 | 210 | 210 |
|  | Partially saponified polyvinyl acetate |  | 0.2 | 0.2 | 0.2 | 0.2 | 0.2 | 0.2 | 0.2 |
|  | Hydroxypropyl methylcellulose |  | 0.2 | 0.2 | 0.2 | 0.2 | 0.2 | 0.2 | 0.2 |
|  | Aluminum sulfate |  | 0.3 | 0.3 | 0.3 | 0.3 | 0.3 | 0.3 | 0.3 |
|  | t-Butyl peroxyneodecanoate |  | 0.05 | 0.05 | 0.05 | 0.05 | 0.05 | 0.05 | 0.05 |
|  | t-Cumyl peroxyneodecanoate |  | 0.05 | 0.05 | 0.05 | 0.05 | 0.05 | 0.05 | 0.05 |
|  | Vinyl chloride |  | 100 | 100 | 100 | 100 | 100 | 100 | 100 |
| Vinyl chloride resin composition | | | | | | | | | |
| Composition/characteristics | Degree of polymerization of chlorinated vinyl chloride resin |  | 733 | 787 | 1125 | 975 | 652 | 523 | 801 |
|  | Content of chlorinated vinyl chloride | [wt %] | 94.6 | 94.6 | 96.9 | 95.9 | 91.4 | 83.8 | 94.7 |
|  | Convent F of silicone resin polycondensate particles B | [wt %] | 5.4 | 5.4 | 3.1 | 4.1 | 8.6 | 16.2 | 5.3 |
|  | Graft rate | [wt %] | 3.9 | 1.8 | 1.1 | 1.5 | 2.9 | 2.2 | 3.6 |
| Evaluation | 0° C. Charpy impact value | [kJ/m$^2$] | 15.0 | 23.2 | 8.1 | 9.5 | 31.6 | 38.2 | 22.6 |
|  | 23° C. Tension tensile strength | [MPa] | 46.2 | 45.6 | 50.0 | 49.0 | 44.3 | 41.3 | 46.3 |
|  | Weight change rate by immersion in 97% sulfuric acid | [%] | 0.06 | 0.05 | 0.03 | 0.03 | 0.45 | 0.95 | 0.35 |
|  | Extrusion appearance |  | ○ | ○ | ○ | ○ | ○ | ○ | ○ |

*1 The proportion of the silicone resin polycondensate particles represents parts by weight of the solid content.
*2 including water in which the silicone resin polycondensate particles are dispersed.
* The unit of the content of each component blended is part by weight.

TABLE 6

| | | | Ex. 32 | Ex. 33 | Ex. 34 | Ex. 35 | Ex. 36 | Ex. 37 | Ex. 38 |
|---|---|---|---|---|---|---|---|---|---|
| | Silicone resin polycondensate particles A | | | | | | | | |
| Components | Ion-exchanged water | | 400 | 400 | 400 | 400 | 400 | 400 | 400 |
| | Octamethylcyclotrasiloxane | | 100 | 100 | 100 | 100 | 100 | 100 | 100 |
| | Tetraethoxysilane | | 10 | 5 | 1 | 5 | 15 | 7 | 7 |
| | Tetramethoxysilane | | — | — | — | — | — | — | — |
| | Methyltriethoxysilane | | — | — | — | — | — | — | — |
| | Vinyltriethoxysilane | | 3 | 2 | 5 | 10 | 5 | 3 | 3 |
| | Vinyltrimethoxysilane | | — | — | — | — | — | — | — |
| | Allyltrimethoxysilan | | — | — | — | — | — | — | — |
| | 3-Methacryloyloxypropyltriethoxysilane | | — | — | — | — | — | — | — |
| | Dodecylbenzenesulfonic acid | | 1 | 1 | 1 | 1 | 1 | 1 | 1 |
| Pattern of polymerization temperature | | | α | α | α | α | α | α | α |
| Evaluation | Particle size | [μm] | 0.17 | 0.16 | 0.13 | 0.17 | 0.12 | 0.17 | 0.17 |
| | Solid concentration | [wt %] | 19.7 | 18.6 | 18.8 | 19.3 | 17.5 | 19.2 | 19.2 |
| | Reaction product X | | | | | | | | |
| Polymerization temperature | | [° C.] | 53.6 | 53.6 | 53.6 | 53.6 | 53.6 | 53.6 | 53.6 |
| Pressure after reaction completion | | [MPa] | 0.52 | 0.52 | 0.52 | 0.52 | 0.52 | 0.52 | 0.52 |
| Components | Silicone resin polycondensate particles *1 | | 4.6 | 4.6 | 4.6 | 4.6 | 4.6 | 1.6 | 26.1 |
| | Ion-exchanged water *2 | | 210 | 210 | 210 | 210 | 210 | 210 | 210 |
| | Partially saponified polyvinyl acetate | | 0.2 | 0.2 | 0.2 | 0.2 | 0.2 | 0.2 | 0.2 |
| | Hydroxypropyl methylcellulose | | 0.2 | 0.2 | 0.2 | 0.2 | 0.2 | 0.2 | 0.2 |
| | Aluminum sulfate | | 0.3 | 0.3 | 0.3 | 0.3 | 0.3 | 0.3 | 0.3 |
| | t-Butyl peroxyneodecanoate | | 0.05 | 0.05 | 0.05 | 0.05 | 0.05 | 0.05 | 0.05 |
| | t-Cumyl peroxyneodecanoate | | 0.05 | 0.05 | 0.05 | 0.05 | 0.05 | 0.05 | 0.05 |
| | Vinyl chloride | | 100 | 100 | 100 | 100 | 100 | 100 | 100 |
| | Vinyl chloride resin composition | | | | | | | | |
| Composition/characteristics | Degree of polymerization of chlorinated vinyl chloride resin | | 871 | 869 | 748 | 711 | 1089 | 1170 | 582 |
| | Content of chlorinated vinyl chloride | [wt %] | 94.5 | 94.6 | 94.7 | 94.6 | 94.5 | 98.1 | 69.4 |
| | Content F of silicone resin polycondensate particles B | [wt %] | 5.5 | 5.4 | 5.3 | 5.4 | 5.5 | 1.9 | 30.6 |
| | Graft rate | [wt %] | 1.9 | 0.8 | 3.96 | 4.2 | 0.8 | 0.9 | 0.8 |
| Evaluation | 0° C. Charpy impact value | [kJ/m²] | 18.6 | 16.2 | 14.2 | 14.4 | 11.4 | 3.4 | 45.2 |
| | 23° C. Tension tensile strength | [MPa] | 46.3 | 45.8 | 46.8 | 46.6 | 47.3 | 52.8 | 12.0 |
| | Weight change rate by immersion in 97% sulfuric acid | [%] | 0.06 | 2.89 | 0.15 | 0.03 | 1.01 | 0.04 | 1.35 |
| | Extrusion appearance | | ○ | ○ | Δ | Δ | Δ | ○ | Δ |

*1 The proportion of the silicone resin polycondensate particles represents parts by weight of the solid content.
*2 including water in which the silicone resin polycondensate particles are dispersed.
* The unit of the content of each component blended is part by weight.

TABLE 7

| | | | Comp. Ex. 1 | Comp. Ex. 2 | Comp. Ex. 3 |
|---|---|---|---|---|---|
| | Silicone resin polycondensate particles A | | | | |
| Components | Ion-exchanged water | | 400 | — | 400 |
| | Octamethylcyclotrasiloxane | | 100 | — | 100 |
| | Tetraethoxysilane | | 5 | — | 5 |
| | Tetramethoxysilane | | — | — | — |
| | Methyltriethoxysilane | | — | — | — |
| | Vinyltriethoxysilane | | 5 | — | — |
| | Vinyltrimethoxysilane | | — | — | — |
| | Allyltrimethoxysilan | | — | — | — |
| | 3-Methacryloyloxypropyltriethoxysilane | | — | — | 5 |
| | Dodecylbenzenesulfonic acid | | 1 | — | 1 |
| Pattern of polymerization temperature | | | α | — | α |
| Evaluation | Particle size | [μm] | 0.17 | — | 0.16 |
| | Solid concentration | [wt %] | 19.2 | — | 19.4 |
| | Reaction product X | | | | |
| Polymerization temperature | | [° C.] | — | 53.6 | 53.6 |
| Pressure after reaction completion | | [MPa] | — | 0.52 | 0.52 |
| Components | Silicone resin polycondensate particles *1 | | — | 0 | 4.6 |
| | Ion-exchanged water *2 | | — | 210 | 210 |
| | Partially saponified polyvinyl acetate | | — | 0.2 | 0.2 |

TABLE 7-continued

|  |  |  | Comp. Ex. | | |
|---|---|---|---|---|---|
|  |  |  | 1 | 2 | 3 |
|  | Hydroxypropyl methylcellulose |  | — | 0.2 | 0.2 |
|  | Aluminum sulfate |  | — | 0.3 | 0.3 |
|  | t-Butyl peroxyneodecanoate |  | — | 0.05 | 0.05 |
|  | t-Cumyl peroxyneodecanoate |  | — | 0.05 | 0.05 |
|  | Vinyl chloride |  | — | 100 | 100 |
|  | Vinyl chloride resin composition | | | | |
| Compo- | Degree of polymerization of chlorinated vinyl chloride resin |  | 970 | 1187 | 1055 |
| sition/ | Content of chlorinated vinyl chloride | [wt %] | 94.7 | 100 | 94.7 |
| charac- | Content F of silicone resin polycondensate particles B | [wt %] | 5.3 | 0 | 5.3 |
| teristics | Graft rate | [wt %] | 0.00 | 0.00 | 0.4 |
| Evalu- | 0° C. Charpy impact value | [kJ/m$^2$] | 6.8 | 1.4 | 12.2 |
| ation | 23° C. Tension tensile strength | [MPa] | 48.2 | 56.2 | 47.2 |
|  | Weight change rate by immersion in 97% sulfuric acid | [%] | 10.22 | 0.01 | 4.49 |
|  | Extrusion appearance |  | X | ◯ | ◯ |

*1 The proportion of the silicone resin polycondensate particles represents parts by weight of the solid content.
*2 including water in which the silicone resin polycondensate particles are dispersed.
* The unit of the content of each component blended is part by weight.

Examples 39 to 50

(1) Manufacture of Silicone Resin Polycondensate Particles A

Formulations shown in Tables 8 and 9 below were mixed at the proportion shown in Tables 8 and 9 below, and the mixture was then emulsified with a homogenizer at 8000 rpm. Next, the resulting emulsion was introduced into a polymerization tank and stirred, and subsequently the gas space in the polymerization tank was replaced with nitrogen. The internal temperature of the polymerization tank was then increased to 85° C. and the reaction was carried out for 3 hours. The internal temperature of the polymerization tank was next decreased to 50° C. over 30 minutes, and the reaction was then carried out at 50° C. for 4.5 hours. Subsequently, the pH was adjusted to 6 to 8 by adding 10 wt % of an aqueous sodium hydroxide solution to provide silicone resin polycondensate particles A having a solid concentration of about 16 to 20 wt %.

(2) Manufacture of Reaction Product X

The inside of a reaction vessel (polymerization vessel) equipped with a stirrer and a jacket was coated with an aqueous polyallylphenol solution serving as a scale inhibitor. Formulations except for vinyl chloride shown in Tables 8 and 9 below were introduced into the reaction vessel at one time. The reaction vessel was then evacuated with a vacuum pump, and further vinyl chloride was introduced into the reaction vessel under stirring. Next, the polymerization was initiated at the polymerization temperature shown in Tables 8 and 9 below while the jacket temperature was controlled. The reaction was terminated after the completion of the reaction was confirmed by the fact that the internal pressure of the reaction vessel decreased to a predetermined pressure. Subsequently, unreacted vinyl chloride was removed, followed by further dehydration and drying to provide reaction products X of the silicone resin polycondensate particles A and polyvinyl chloride.

(3) Manufacture of Vinyl Chloride Resin Composition

The obtained reaction product X and a post-chlorinated vinyl chloride resin (produced by Tokuyama Sekisui Co. Ltd., "HA-58K: chlorine content ratio 67.3 wt %, degree of polymerization 1000 type", "HA-54H: chlorine content ratio 65.4 wt %, degree of polymerization 1000 type", or "HA-54F: chlorine content ratio 64.0 wt %, degree of polymerization 1000 type") were blended so that the contents of the post-chlorinated vinyl chloride resin, polyvinyl chloride, and particles B in the vinyl chloride resin composition to be obtained were as shown in Tables 8 and 9 below to provide vinyl chloride resin compositions.

Example 51

A reaction product X and a vinyl chloride resin composition were obtained in the same manner as in Example 41 except that a scale inhibitor was not used in the manufacture of the reaction product X.

Comparative Example 4

The silicone resin polycondensate particles A obtained in Example 39 were provided. The particles A and a post-chlorinated vinyl chloride resin (produced by Tokuyama Sekisui Co. Ltd., "HA-58K: chlorine content ratio 67.3 wt %, degree of polymerization 1000 type") were blended so that the contents of the post-chlorinated vinyl chloride resin and the particles A in the vinyl chloride resin composition to be obtained were as shown in Table 10 below to provide a vinyl chloride resin composition.

Example 52

A reaction product X was obtained in the same manner as in Example 39 except that the kinds and proportion of the formulations used for manufacturing the silicone resin polycondensate particles A and for manufacturing the reaction product X were changed as shown in Table 10 below.

Synthesis of Post-Chlorinated Vinyl Chloride Resin:

Formulations except for vinyl chloride shown in Table 10 below were introduced at one time into a reaction vessel equipped with a stirrer and a jacket. The reaction vessel was then evacuated with a vacuum pump, and further 100 parts by weight of vinyl chloride was introduced into the reaction vessel under stirring. Next, the polymerization was initiated at an internal temperature of 57.5° C. while the jacket temperature was controlled. The reaction was terminated after the completion of the reaction was confirmed by the fact that the internal pressure of the reaction vessel decreased to 0.7 MPa.

Subsequently, unreacted vinyl chloride was removed, followed by further dehydration and drying to provide a vinyl chloride resin.

A glass-lined pressure-resistant reaction tank with an inner capacity of 300 L was charged with 500 parts by weight of deionized water and 100 parts by weight of the vinyl chloride resin obtained above. The mixture was stirred to disperse the vinyl chloride resin in water, and the reaction tank was evacuated by suction with a vacuum pump to reduce the gage pressure to −78.4 kPa. The pressure was returned to normal pressure (that is, the gage pressure was returned to 0) by nitrogen gas, and the reaction tank was evacuated again by suction with a vacuum pump to remove oxygen inside of the reaction tank. Meanwhile, the internal temperature of the reaction vessel was increased by circulating heated oil through the jacket.

The supply of chlorine gas was started when the internal temperature of the reaction tank reached 100° C., and the reaction was allowed to proceed at a constant temperature of 110° C. The chlorine content ratio of the vinyl chloride resin in the reactor was calculated from the concentration of hydrogen chloride generated in the reaction tank. When the chlorine content ratio reached 63.5 wt %, the supply of chlorine gas was stopped to terminate the chlorination reaction. Furthermore, nitrogen gas was supplied to the reaction tank to remove unreacted chlorine, and the obtained resin was washed with water, dehydrated, and dried to provide a powdery post-chlorinated vinyl chloride resin. The chlorine content ratio of the obtained post-chlorinated vinyl chloride resin was 63.5 wt %, and the degree of polymerization was 1020.

The obtained reaction product X and the post-chlorinated vinyl chloride resin were blended so that the contents of the post-chlorinated vinyl chloride resin, polyvinyl chloride, and particles B in the vinyl chloride resin composition to be obtained were as shown in Table 10 below to provide a vinyl chloride resin composition.

Example 53

A reaction product X was obtained in the same manner as in Example 39 except that the kinds and proportion of the formulations used for manufacturing the silicone resin polycondensate particles A and for manufacturing the reaction product X were changed as shown in Table 10 below.

Synthesis of Post-Chlorinated Vinyl Chloride Resin:

Formulations except for vinyl chloride shown in Table 10 below were introduced at one time into a reaction vessel equipped with a stirrer and a jacket. The reaction vessel was then evacuated with a vacuum pump, and further 100 parts by weight of vinyl chloride was introduced into the reaction vessel under stirring. Next, the polymerization was initiated at an internal temperature of 57.5° C. while the jacket temperature was controlled. The reaction was terminated after the completion of the reaction was confirmed by the fact that the internal pressure of the reaction vessel decreased to 0.7 MPa. Subsequently, unreacted vinyl chloride was removed, followed by further dehydration and drying to provide a vinyl chloride resin.

A glass-lined pressure-resistant reaction tank with an inner capacity of 300 L was charged with 500 parts by weight of deionized water and 100 parts by weight of the vinyl chloride resin obtained above. The mixture was stirred to disperse the vinyl chloride resin in water, and the reaction tank was evacuated by suction with a vacuum pump to reduce the gage pressure to −78.4 kPa. The pressure was returned to normal pressure (that is, the gage pressure was returned to 0) by nitrogen gas, and the reaction tank was evacuated again by suction with a vacuum pump to remove oxygen inside of the reaction tank. Meanwhile, the internal temperature of the reaction vessel was increased by circulating heated oil through the jacket.

The supply of chlorine gas was started when the internal temperature of the reaction tank reached 70° C. The reaction was allowed to proceed while the inside of the tank was irradiated with ultraviolet rays from a mercury lamp. The chlorine content ratio of the chlorine content ratio in the reactor was calculated from the concentration of hydrogen chloride generated in the reaction tank. When the chlorine content ratio reached 71.5 wt %, the supply of chlorine gas was stopped to terminate the chlorination reaction.

Furthermore, nitrogen gas was supplied to the reaction tank to remove unreacted chlorine, and the obtained resin was washed with water, dehydrated, and dried to provide a powdery post-chlorinated vinyl chloride resin. The chlorine content ratio of the obtained post-chlorinated vinyl chloride resin was 71.5 wt %, and the degree of polymerization was 960.

The obtained reaction product X and the post-chlorinated vinyl chloride resin were blended so that the contents of the post-chlorinated vinyl chloride resin, polyvinyl chloride, and particles B in the vinyl chloride resin composition to be obtained were as shown in Table 10 below to provide a vinyl chloride resin composition.

Evaluation on Examples 39 to 53 and Comparative Example 4

The reaction products X and the vinyl chloride resin compositions obtained in Examples 39 to 53 and Comparative Example 4 were evaluated for evaluation items (1), (2), (3), (4), (5), (7), (8), (9) and (10) mentioned above in the same manner as in Example 1. They were further evaluated for the following evaluation item (14).

(14) Evaluation for Amount of Adhering Substances Generated During Polymerization of Reaction Product X Since it was difficult to remove all adhering substances inside the polymerization vessel, relative evaluation was visually made. The adhering substances were rated as 1, 2, 3, 4, and 5 in descending order. A larger number in the result of the rating indicates a smaller amount of the adhering substances.

The results are shown in Tables 8 to 10 below.

TABLE 8

|  |  | Ex. | | | | | |
| --- | --- | --- | --- | --- | --- | --- | --- |
|  |  | 39 | 40 | 41 | 42 | 43 | 44 |
| Silicone resin polycondensate particles A | | | | | | | |
| Compo- | Ion-exchanged water | 400 | 400 | 400 | 400 | 400 | 400 |
| nents | Octamethylcyclotetrasiloxane | 100 | 100 | 100 | 100 | 100 | 100 |
|  | Tetraethoxysilane | 7 | 7 | 7 | 7 | 7 | 7 |
|  | Vinyltriethoxysilane | 3 | 3 | 3 | 3 | 3 | 3 |
|  | Dodecylbenzenesulfonic acid | 1 | 1 | 1 | 1 | 1 | 1 |

TABLE 8-continued

|  |  |  | Ex. 39 | Ex. 40 | Ex. 41 | Ex. 42 | Ex. 43 | Ex. 44 |
|---|---|---|---|---|---|---|---|---|
| Evaluation | Particle size | [μm] | 0.14 | 0.14 | 0.14 | 0.14 | 0.14 | 0.14 |
|  | Solid concentration | [wt %] | 19.2 | 19.2 | 19.2 | 19.2 | 19.2 | 19.2 |
| Reaction product X | | | | | | | | |
| Components | Polymerization temperature | [° C.] | 64 | 64 | 64 | 64 | 64 | 64 |
|  | Pressure after reaction completion | [MPa] | 0.52 | 0.52 | 0.52 | 0.52 | 0.52 | 0.52 |
|  | Silicone resin polycondensate particles *1 |  | 13.6 | 27.0 | 27.0 | 27.0 | 27.0 | 27.0 |
|  | Ion-exchanged water *2 |  | 210 | 210 | 210 | 210 | 210 | 210 |
|  | Partially saponified polyvinyl acetate |  | 0.2 | — | — | — | — | — |
|  | Hydroxypropyl methylcellulose |  | 0.2 | — | — | — | — | — |
|  | Aluminum sulfate |  | 0.9 | — | — | — | — | — |
|  | t-Butyl peroxyneodecanoate |  | 0.05 | 0.05 | — | — | — | — |
|  | t-Cumyl peroxyneodecanoate |  | 0.05 | 0.05 | — | — | — | — |
|  | Ammonium persulfate |  | — | — | 0.15 | 0.15 | 0.15 | 0.15 |
|  | Vinyl chloride |  | 100 | 100 | 100 | 100 | 100 | 100 |
| Coating of scale inhibitor | | | 有り | 有り | 有り | 有り | 有り | 有り |
| Evaluation | Degree of polymerization of polyvinyl chloride |  | 612 | 489 | 462 | 462 | 462 | 462 |
|  | Content D of silicone resin polycondensate particles B | [wt %] | 15.2 | 29.0 | 26.8 | 26.8 | 26.8 | 26.8 |
|  | Content E of polyvinyl chloride | [wt %] | 84.8 | 71.0 | 73.2 | 73.2 | 73.2 | 73.2 |
|  | Amount of adhering substances in polymerization vessel |  | 5 | 3 | 3 | 3 | 3 | 3 |
| Vinyl chloride resin composition | | | | | | | | |
| Composition/characteristics | Chlorine content ratio in chlorinated vinyl chloride resin | [wt %] | 67.3 | 65.4 | 65.4 | 67.3 | 64 | 70.5 |
|  | Degree of polymerization of chlorinated vinyl chloride resin |  | 990 | 1000 | 1000 | 990 | 1010 | 960 |
|  | Content of chlorinated vinyl chloride resin | [wt %] | 54.4 | 80.4 | 78.4 | 92.8 | 49.4 | 78.4 |
|  | Content of polyvinyl chloride | [wt %] | 45.6 | 19.6 | 21.6 | 7.2 | 50.6 | 21.6 |
|  | Content F of silicone resin polycondensate particles B | [wt %] | 4.76 | 4.76 | 4.76 | 1.8 | 9 | 4.76 |
|  | Chlorine content ratio in chlorinated vinyl chloride composition | [wt %] | 61.0 | 61.0 | 61.0 | 65.5 | 56.5 | 65.4 |
| Evaluation | 23° C. Charpy impact value | [kJ/m$^2$] | 19.0 | 14.5 | 16.7 | 10.2 | 32.1 | 11.5 |
|  | 23° C. Tension tensile strength | [MPa] | 52.1 | 55.1 | 54.8 | 59.4 | 45.1 | 58.9 |
|  | Vicat softening temperature | [° C.] | 103.9 | 103.5 | 103.2 | 115.8 | 83.6 | 115.2 |
|  | Weight change rate by immersion in 97% sulfuric acid | [%] | 0.18 | 0.25 | 0.31 | 0.11 | 0.45 | 0.33 |

*1 The proportion of the silicone resin polycondensate particles represents parts by weight of the solid content.
*2 including water in which the silicone resin polycondensate particles are dispersed.
* The unit of the content of each component blended is part by weight.

TABLE 9

|  |  |  | Ex. 45 | Ex. 46 | Ex. 47 | Ex. 48 | Ex. 49 | Ex. 50 | Ex. 51 |
|---|---|---|---|---|---|---|---|---|---|
| Silicone resin polycondensate particles A | | | | | | | | | |
| Components | Ion-exchanged water |  | 400 | 400 | 400 | 400 | 400 | 400 | 400 |
|  | Octamethylcyclotetrasiloxane |  | 100 | 100 | 100 | 100 | 100 | 100 | 100 |
|  | Tetraethoxysilane |  | 7 | 3 | 3 | 1 | 3 | 3 | 7 |
|  | Vinyltriethoxysilane |  | 3 | 7 | 1 | 7 | 7 | 7 | 3 |
|  | Dodecylbenzenesulfonic acid |  | 0.5 | 0.5 | 0.5 | 0.5 | 0.5 | 3 | 1 |
| Evaluation | Particle size | [μm] | 0.21 | 0.17 | 0.24 | 0.14 | 0.17 | 0.19 | 0.14 |
|  | Solid concentration | [wt %] | 19.2 | 19.2 | 19.2 | 19.2 | 19.2 | 19.2 | 19.2 |
| Reaction product X | | | | | | | | | |
| Components | Polymerization temperature | [° C.] | 64 | 64 | 64 | 64 | 64 | 64 | 64 |
|  | Pressure after reaction completion | [MPa] | 0.52 | 0.52 | 0.52 | 0.52 | 0.52 | 0.52 | 0.52 |
|  | Silicone resin polycondensate particles *1 |  | 27.0 | 27.0 | 27.0 | 27.0 | 27.0 | 27.0 | 27.0 |
|  | Ion-exchanged water *2 |  | 210 | 210 | 210 | 210 | 210 | 210 | 210 |
|  | Partially saponified polyvinyl acetate |  | — | — | — | — | — | — | — |
|  | Hydroxypropyl methylcellulose |  | — | — | — | — | — | — | — |
|  | Aluminum sulfate |  | — | — | — | — | — | — | — |
|  | t-Butyl peroxyneodecanoate |  | — | — | — | — | — | — | — |
|  | t-Cumyl peroxyneodecanoate |  | — | — | — | — | — | — | — |

TABLE 9-continued

|  |  |  | Ex. | | | | | | |
|---|---|---|---|---|---|---|---|---|---|
|  |  |  | 45 | 46 | 47 | 48 | 49 | 50 | 51 |
|  | Ammonium persulfate |  | 0.15 | 0.15 | 0.15 | 0.15 | 0.15 | 0.15 | 0.15 |
|  | Vinyl chloride |  | 100 | 100 | 100 | 100 | 100 | 100 | 100 |
| Coating of scale inhibitor |  |  | 有り | 有り | 有り | 有り | 有り | 有り | 無し |
| Evaluation | Degree of polymerization of polyvinyl chloride |  | 462 | 462 | 462 | 462 | 462 | 462 | 462 |
|  | Content D of silicone resin polycondensate particles B | [wt %] | 26.8 | 26.8 | 25.4 | 25.9 | 26.8 | 23.9 | 26.8 |
|  | Content E of polyvinyl chloride | [wt %] | 73.2 | 73.2 | 74.6 | 74.1 | 73.2 | 76.1 | 73.2 |
|  | Amount of adhering substances in polymerization vessel |  | 2 | 2 | 3 | 3 | 4 | 5 | 1 |
| Vinyl chloride resin composition |  |  |  |  |  |  |  |  |  |
| Composition/characteristics | Chlorine content ratio in chlorinated vinyl chloride resin | [wt %] | 67.3 | 67.3 | 67.3 | 67.3 | 67.3 | 67.3 | 65.4 |
|  | Degree of polymerization of chlorinated vinyl chloride resin |  | 990 | 990 | 990 | 990 | 990 | 990 | 1000 |
|  | Content of chlorinated vinyl chloride resin | [wt %] | 78.4 | 78.4 | 78.9 | 78.4 | 78.4 | 78.4 | 78.4 |
|  | Content of polyvinyl chloride | [wt %] | 21.6 | 21.6 | 21.1 | 21.6 | 21.6 | 21.6 | 21.6 |
|  | Content F of silicone resin polycondensate particles B | [wt %] | 4.76 | 4.76 | 4.76 | 4.76 | 4.76 | 4.76 | 4.76 |
|  | Chlorine content ratio in chlorinated vinyl chloride composition | [wt %] | 62.0 | 63.0 | 62.8 | 62.7 | 63.0 | 62.7 | 61.0 |
| Evaluation | 23° C. Charpy impact value | [kJ/m$^2$] | 14.2 | 18.3 | 13.3 | 12.7 | 18.0 | 18.2 | 16.5 |
|  | 23° C. Tension tensile strength | [MPa] | 57.3 | 55.0 | 56.0 | 52.5 | 55.5 | 54.1 | 54.6 |
|  | Vicat softening temperature | [° C.] | 112.8 | 113 | 111.5 | 112.9 | 113.1 | 113 | 103.1 |
|  | Weight change rate by immersion in 97% sulfuric acid | [%] | 0.35 | 0.37 | 0.33 | 0.31 | 0.37 | 0.35 | 0.31 |

*1 The proportion of the silicone resin polycondensate particles represents parts by weight of the solid content.
*2 including water in which the silicone resin polycondensate particles are dispersed.
* The unit of the content of each component blended is part by weight.

TABLE 10

|  |  |  | Comp. Ex. | Ex. | |
|---|---|---|---|---|---|
|  |  |  | 4 | 52 | 53 |
| Silicone resin polycondensate particles A |  |  |  |  |  |
| Components | Ion-exchanged water |  | 400 | 400 | 400 |
|  | Octamethylcyclotetrasiloxane |  | 100 | 100 | 100 |
|  | Tetraethoxysilane |  | 7 | 7 | 7 |
|  | Vinyltriethoxysilane |  | 3 | 3 | 3 |
|  | Dodecylbenzenesulfonic acid |  | 1 | 1 | 1 |
| Evaluation | Particle size | [µm] | 0.14 | 0.14 | 0.14 |
|  | Solid concentration | [wt %] | 19.2 | 19.2 | 19.2 |
| Reaction product X |  |  |  |  |  |
| Components | Polymerization temperature | [° C.] | — | 64 | 64 |
|  | Pressure after reaction completion | [MPa] | — | 0.52 | 0.52 |
|  | Silicone resin polycondensate particles *1 |  | — | 27.0 | 27.0 |
|  | Ion-exchanged water *2 |  | — | 210 | 210 |
|  | Partially saponified polyvinyl acetate |  | — | — | — |
|  | Hydroxypropyl methylcellulose |  | — | — | — |
|  | Aluminum sulfate |  | — | — | — |
|  | t-Butyl peroxyneodecanoate |  | — | — | — |
|  | t-Cumyl peroxyneodecanoate |  | — | — | — |
|  | Ammonium persulfate |  | — | 0.15 | 0.15 |
|  | Vinyl chloride |  | — | 100 | 100 |
| Coating of scale inhibitor |  |  | — | 有り | 有り |
| Evaluation | Degree of polymerization of polyvinyl chloride |  | — | 462 | 462 |
|  | Content D of silicone resin polycondensate particles B | [wt %] | — | 26.8 | 26.8 |
|  | Content E of polyvinyl chloride | [wt %] | — | 73.2 | 73.2 |
|  | Amount of adhering substances in polymerization vessel |  | — | 2 | 2 |

TABLE 10-continued

|  |  |  | Comp. Ex. | Ex. | |
|---|---|---|---|---|---|
|  |  |  | 4 | 52 | 53 |
| Vinyl chloride resin composition | | | | | |
| Composition/characteristics | Chlorine content ratio in chlorinated vinyl chloride resin | [wt %] | 67.3 | 63.5 | 71.5 |
| | Degree of polymerization of chlorinated vinyl chloride resin | | 990 | 1020 | 960 |
| | Content of chlorinated vinyl chloride resin | [wt %] | 95.7 | 49.4 | 78.4 |
| | Content of polyvinyl chloride | [wt %] | 0.0 | 50.6 | 21.6 |
| | Content F of silicone resin polycondensate particles B | [wt %] | 4.8 | 9 | 4.8 |
| | Chlorine content ratio in chlorinated vinyl chloride composition | [wt %] | 64.0 | 56.1 | 66.2 |
| Evaluation | 23° C. Charpy impact value | [kJ/m$^2$] | 3.4 | 21.5 | 8.1 |
| | 23° C. Tension tensile strength | [MPa] | 56.4 | 44.8 | 57.2 |
| | Vicat softening temperature | [° C.] | 97.6 | 79.3 | 118.1 |
| | Weight change rate by immersion in 97% sulfuric acid | [%] | 8.8 | 1.5 | 2.5 |

*1 The proportion of the silicone resin polycondensate particles represents parts by weight of the solid content.
*2 including water in which the silicone resin polycondensate particles are dispersed.
* The unit of the content of each component blended is part by weight.

The vinyl chloride resin composition was obtained in the same manner as in Examples 39, 40, and 42 to 50 except that a scale inhibitor was not used in the manufacture of the reaction product X, and evaluated in the same manner as in Examples 39, 40, 42 to 50. The evaluation results were the same as those in Examples 39, 40, 42 to 50 except that the amount of the adhering substances in the polymerization vessel was larger.

Formed Article Production Example 1

Formulation

The vinyl chloride resin composition obtained in Example 46 was provided. This vinyl chloride resin composition and various blending agents shown in Table 11 below were blended and mixed while being heated from room temperature (23° C.) to 110° C. with a Henschel mixer, and the mixture was cooled to 50° C. with a cooling mixer to provide a blended powder.

TABLE 11

Composition in formed article production Example 1

| | Classification | Composition | Product name | Manufacturer | Unit | — |
|---|---|---|---|---|---|---|
| Components (Part by weight) | Resin | Vinyl chloride resin composition | — | — | Parts by weight | 100 |
| | Stabilizer | Octyl tin mercapto, malate | TVS8570 | NITTO KASEI CO., LTD. | Parts by weight | 2 |
| | Lubricant | PEWAX | Hiwax220MP | Mitsui Chemicals, Inc. | Part by weight | 1 |
| | | Stearic acid | Stearic acid SAKURA | NOF CORPORATION | Parts by weight | 0.5 |
| | | Highly oxidized PEWAX | AC316A | Honeywell | Parts by weight | 0.5 |
| | Total | | | | Parts by weight | 104 |

[Forming]

Extrusion was performed using the blended powder and an extruder (forming machine) having a resin retention part in a resin passage in the following extrusion conditions to provide a pipe serving as a formed article.

Extruder: produced by Osada Seisakusho Ltd., SLM50 (counter-rotating conical twin screw extruder)
Resin retention part: resin breaker, one sheet, resin-flowing surface with chrome plating
Mold: mold for pipes, outlet outer radius 13.33 mm, outlet inner radius 10 mm, resin-flowing surface with chrome plating, 3 bridges
Extrusion rate: 30 kg/h
Resin temperature: 200° C. (temperature at mold inlet)
Revolution number: 20 to 25 rpm
Mold temperature: D1: 190° C., D2: 205° C., D3: 210° C. (end parallel part)

Formed Article Production Example 2

A pipe serving as a formed article was obtained in the same manner as in Formed Article Production Example 1 except that a forming machine was used which has no resin retention part and has no resin breaker in a resin passage between an extruder outlet and a mold.

Evaluation on Formed Article Production Examples 1 and 2

The cross-section of the pipe serving as the obtained formed article was sanded with 1000 grit sandpaper, and the kneading level in the pipe thick part was visually evaluated. As a result, the kneading level in the pipe obtained in Formed Article Production Example 1 was confirmed to have better kneading level than that of the pipe obtained in Formed Article Production Example 2.

The invention claimed is:

1. A reaction product of silicone resin polycondensate particles and polyvinyl chloride obtained by causing reaction of a material containing silicone resin polycondensate particles and a vinyl chloride monomer, the silicone resin polycondensate particles being obtained by causing reaction of a material mixture containing a first organosilicon compound having a structural unit represented by a formula (1) below and serving as a siloxane, a second organosilicon compound represented by a formula (2) below, a third organosilicon compound represented by a formula (3A) or formula (3B) below, and a fourth organosilicon compound represented by a formula (4A), formula (4B), or formula (4C) below:

[Chemical Formula 1]

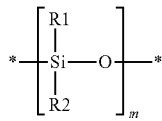

Formula (1)

in the formula (1), R1 and R2 each represent a phenyl group or a C1 to C3 alkyl group, and m represents an integer of from 1 to 20;

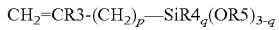

Formula (2)

in the formula (2), R3 represents a hydrogen atom or a methyl group, R4 and R5 each represent a hydrogen atom or a C1 to C3 alkyl group, p represents an integer of from 0 to 3, and q represents an integer of from 0 to 2;

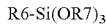

Formula (3A)

in the formula (3A), R6 and R7 each represent a C1 to C3 alkyl group;

Formula (3B)

in the formula (3B), R8 represents a C1 to C3 alkyl group;

[Chemical Formula 2]

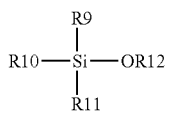

Formula (4A)

in the formula (4A), R9 to R11 each represent an unsaturated hydrocarbon group or a C1 to C3 alkyl group, and R12 represents a hydrogen atom or a C1 to C3 alkyl group;

[Chemical Formula 3]

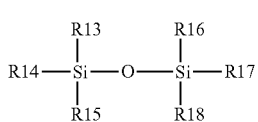

Formula (4B)

in the formula (4B), R13 to R18 each represent an unsaturated hydrocarbon group or a C1 to C3 alkyl group;

[Chemical Formula 4]

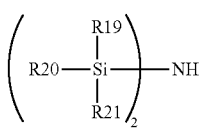

Formula (4C)

in the formula (4C), R19 to R21 each represent an unsaturated hydrocarbon group or a C1 to C3 alkyl group.

2. The reaction product of silicone resin polycondensate particles and polyvinyl chloride according to claim 1, wherein the silicone resin polycondensate particles are obtained by causing reaction of a mixture containing 100 parts by weight of the first organosilicon compound having the structural unit represented by the formula (1) above and serving as a siloxane, 3 parts by weight or more and 7 parts by weight or less of the second organosilicon compound represented by the formula (2) above, and 2 parts by weight or more and 10 parts by weight or less of the third organosilicon compound represented by the formula (3A) or formula (3B) above.

3. The reaction product of silicone resin polycondensate particles and polyvinyl chloride according to claim 1, wherein the silicone resin polycondensate particles are obtained by causing reaction of a material mixture containing 100 parts by weight of the first organosilicon compound having the structural unit represented by the formula (1) above and serving as a siloxane, 0.5 parts by weight or more and 10 parts by weight or less of the second organosilicon compound represented by the formula (2) above, 0.5 parts by weight or more and 10 parts by weight or less of the third organosilicon compound represented by the formula (3A) or formula (3B) above, and 0.25 parts by weight or more and 10 parts by weight or less of the fourth organosilicon compound represented by the formula (4A), formula (4B), or formula (4C) above.

4. The reaction product of silicone resin polycondensate particles and polyvinyl chloride according to claim 1, wherein the reaction product is obtained by causing reaction of a material containing 2 wt % or more and 95 wt % or less of the silicone resin polycondensate particles and 5 wt % or more and 98 wt % or less of the vinyl chloride monomer in 100 wt % of a total of the silicone resin polycondensate particles and the vinyl chloride monomer.

5. The reaction product of silicone resin polycondensate particles and polyvinyl chloride according to claim 1, wherein the reaction product is obtained by causing reaction of a material containing 2 wt % or more and 20 wt % or less of the silicone resin polycondensate particles and 80 wt % or more and 98 wt % or less of the vinyl chloride monomer in 100 wt % of a total of the silicone resin polycondensate particles and the vinyl chloride monomer.

6. The reaction product of silicone resin polycondensate particles and polyvinyl chloride according to claim 1, wherein the reaction product is obtained by causing reaction of a material containing 20 wt % or more and 95 wt % or less of the silicone resin polycondensate particles and 5 wt % or more and 80 wt % or less of the vinyl chloride monomer in 100 wt % of a total of the silicone resin polycondensate particles and the vinyl chloride monomer.

7. The reaction product of silicone resin polycondensate particles and polyvinyl chloride according to claim 1, wherein the second organosilicon compound represented by the formula (2) above is vinyltriethoxysilane or vinyltrimetoxysilane.

8. The reaction product of silicone resin polycondensate particles and polyvinyl chloride according to claim 1, wherein the reaction product is obtained by causing reaction of a material containing the silicone resin polycondensate particles and the vinyl chloride monomer, followed by washing with a solvent.

9. A method for manufacturing the reaction product of silicone resin polycondensate particles A and polyvinyl chloride according to claim 8, wherein
the reaction product is provided by causing reaction of a material containing the silicone resin polycondensate particles and the vinyl chloride monomer, followed by washing with a solvent.

10. A vinyl chloride resin composition containing the reaction product of silicone resin polycondensate particles and polyvinyl chloride according to claim 1, and a vinyl chloride resin or chlorinated vinyl chloride resin.

11. The vinyl chloride resin composition according to claim 10, wherein a content ratio of the reaction product of silicone resin polycondensate particles and polyvinyl chloride to a total of the vinyl chloride resin and the chlorinated vinyl chloride resin is from 2.0:98.0 to 60.0:40.0 by weight.

12. The vinyl chloride resin composition according to claim 10, wherein a content of particles derived from the silicone resin polycondensate particles is 1.6 wt % or more and 51 wt % or less.

13. The vinyl chloride resin composition according to claim 10, wherein the vinyl chloride resin composition contains the chlorinated vinyl chloride resin and has a chlorine content ratio of 56.5 wt % or more and 65.5 wt % or less.

14. A method for manufacturing a vinyl chloride resin composition using the reaction product of silicone resin polycondensate particles and polyvinyl chloride according to claim 1, the method comprising the step of:
blending the vinyl chloride resin or chlorinated vinyl chloride resin with the reaction product obtained by causing reaction of a material containing the silicone resin polycondensate particles and the vinyl chloride monomer, to provide a vinyl chloride resin composition containing the reaction product and the vinyl chloride resin or chlorinated vinyl chloride resin.

15. The method for manufacturing a vinyl chloride resin composition according to claim 14, wherein the reaction product and the chlorinated vinyl chloride resin are blended to provide a vinyl chloride resin composition containing the reaction product and the chlorinated vinyl chloride resin and having a chlorine content ratio of 56.5 wt % or more and 65.5 wt % or less.

16. The method for manufacturing a vinyl chloride resin composition according to claim 14, the method further comprising the step of causing reaction of a material containing the silicone resin polycondensate particles and the vinyl chloride monomer to provide the reaction product.

* * * * *